United States Patent [19]

Chen et al.

[11] Patent Number: 5,770,539

[45] Date of Patent: *Jun. 23, 1998

[54] LEWIS ACID CATALYSTS SUPPORTED ON POROUS POLYMER SUBSTRATE

[75] Inventors: Frank Joung-Yei Chen, Edison, N.J.; Tze-Chiang Chung, State College, Pa.; Jon Edmond Stanat, Westfield, N.J.; Soon Hong Lee, State College, Pa.

[73] Assignee: Exxon Chemical Patents Inc., Linden, N.J.

[ * ] Notice: The term of this patent shall not extend beyond the expiration date of Pat. No. 5,288,677.

[21] Appl. No.: 588,276

[22] Filed: Jan. 18, 1996

Related U.S. Application Data

[63] Continuation of Ser. No. 65,325, May 20, 1993, abandoned.

[51] Int. Cl.⁶ .................................................. B01J 31/00
[52] U.S. Cl. .......................... 502/152; 502/159; 502/163
[58] Field of Search .................................. 502/152, 159, 502/163

[56] References Cited

U.S. PATENT DOCUMENTS

| | | | |
|---|---|---|---|
| 3,255,167 | 6/1966 | Thomas | 260/88.2 |
| 3,629,150 | 12/1971 | Addy | 252/442 |
| 3,721,632 | 3/1973 | Miller et al. | 252/442 |
| 3,925,495 | 12/1975 | Rodewald | 260/666 |
| 3,984,352 | 10/1976 | Rodewald | 252/436 |
| 4,112,011 | 9/1978 | Kolombos | 260/683.15 |
| 4,116,880 | 9/1978 | Olah | 252/429 |
| 4,139,417 | 2/1979 | Marie et al. | 252/51.5 A |
| 4,167,616 | 9/1979 | Bollinger | 526/197 |
| 4,235,756 | 11/1980 | Slaugh | 252/463 |
| 4,288,649 | 9/1981 | McCaulay | 585/533 |
| 4,306,105 | 12/1981 | Abernathy et al. | 585/533 |
| 4,342,849 | 8/1982 | Kennedy | 525/333.7 |
| 4,542,301 | 9/1985 | Narabu | 307/269 |
| 4,558,170 | 12/1985 | Chen et al. | 585/532 |
| 4,582,818 | 4/1986 | DeClippeleir et al. | 502/231 |
| 4,605,808 | 8/1986 | Samson | 585/525 |
| 4,638,092 | 1/1987 | Ritter | 568/1 |
| 4,719,190 | 1/1988 | Drago et al. | 502/64 |
| 4,734,472 | 3/1988 | Chung | 526/239 |
| 4,751,276 | 6/1988 | Chung | 526/158 |
| 4,798,190 | 1/1989 | Vaznaian et al. | 123/531 |
| 4,929,800 | 5/1990 | Drago et al. | 585/744 |
| 5,169,818 | 12/1992 | Antberg et al. | 502/159 |
| 5,288,677 | 2/1994 | Chung et al. | 502/152 |

FOREIGN PATENT DOCUMENTS

| | | |
|---|---|---|
| 0 273 627 | 6/1988 | European Pat. Off. . |
| 0 273 627 | 7/1988 | European Pat. Off. . |
| 0 274 912 | 7/1988 | European Pat. Off. . |
| 0393751 A2 | 10/1990 | European Pat. Off. ........ C08F 10/00 |
| 59-80413 | 9/1984 | Japan . |
| 2 001 662 | 7/1979 | United Kingdom . |
| 2 001 662 A | 7/1979 | United Kingdom . |

OTHER PUBLICATIONS

B. Sket et al., J. Makromol. Sci–Chem., A19(5), 643(1983).
D. C. Neckers et al., J. Am. Chem. Soc. 94(26), 9284(1972).
Y. A. Sangalov et al., Dokl. Akad. Nauk. SSSR, 265(3), 671(1982).
M. Hino et al., Chem. Lett. (1980,963).
K. Tanabe et al., Successful Design of Catalysts, p. 99, T.Inui Ed., Elsevier Sci. Publish. Amsterdam (1988).
Collomb et al., in Europ. Polym, J., 16(2), 1135(1980).
M. Marek et al., Makromol. Chem. Symp. 13/14, 443(1988).
Cationic Polymerization Of Olefins: A Critical Inventory, Kennedy, Joseph P., John Wiley & Sons, NY (1975).
Carbocationic Polymerization, Kennedy, Joseph P., John Wiley & Sons, NY (1982).
T. C. Chung and D. Rhubright, Mackromolecules, vol. 24, 970–972, (1991).
T. C. Chung, Journal of Inorganic and Organometallic Polymers, vol. 1, No. 1, 37–51, (1991).

*Primary Examiner*—Asok Pal
*Attorney, Agent, or Firm*—H. L. Cohen

[57] ABSTRACT

Immobilized Lewis Acid catalyst comprising porous polymer film substrate having at least one Lewis Acid immobilized on pore surfaces thereof, said polymer film substrate prior to having said Lewis Acid immobilized thereon comprising a porous film of functionalized polymer and, optionally, unfunctionalized polymer, said functionalized polymer having within its structure units represented by the formula $$-(CH_2-CH)_x-(CH_2-CH)_y-$$
$$\phantom{-(CH_2-CH)_x-}|\phantom{(CH_2-}|$$
$$\phantom{-(CH_2-CH)_x-}R^1\phantom{(CH_2-}R^2$$
$$\phantom{-(CH_2-CH)_x-(CH_2-CH)_y}|$$
$$\phantom{-(CH_2-CH)_x-(CH_2-CH)_y}D$$

and said unfunctionalized polymer having within its structure repeating monomer units represented by the formula $$-CH_2-CH-$$
$$\phantom{-CH_2-}|$$
$$\phantom{-CH_2-}R^1$$

wherein
D represents OH, halide, $NH_2$, $NHR^3$, OM', or OM";
$R^1$ represents hydrogen, $C_1$–$C_{24}$ alkyl, $C_3$–$C_{24}$ cycloalkyl, $C_6$–$C_{18}$ aryl or $C_7$–$C_{30}$ alkylaryl;
$R^2$ represents $C_3$–$C_{24}$ alkyl, $C_3$–$C_{24}$ cycloalkyl, $C_6$–$C_{18}$ aryl or $C_7$–$C_{30}$ alkaryl;
$R^3$ represents $C_1$–$C_{24}$ alkyl, $C_3$–$C_{24}$ cycloalkyl, $C_6$–$C_{18}$ aryl or $C_7$–$C_{30}$ alkaryl;
M' represents alkali metal;
M" represents alkaline-earth metal; and
x and y represent the mole % of each respective subunit, the sum of x+y being 100%. The immobilized Lewis Acid catalyst system is useful for carbocationic polymerization of olefin monomer.

26 Claims, 5 Drawing Sheets

LEWIS ACID CATALYSTS SUPPORTED ON POROUS POLYMER SUBSTRATE

This is a continuation, of application Ser. No. 08/065,325, filed May 20, 1993, now abandoned.

TECHNICAL FIELD

This invention relates to catalysts. More particularly, the invention relates to Lewis Acid catalysts which are immobilized on a porous polymer substrate.

BACKGROUND OF THE INVENTION

Among the most powerful initiators for carbocationic polymerization of monoolefins are the Lewis Acids such as, for example, boron trifluoride and trichloride, aluminum trichloride, triethyl aluminum, diethyl aluminum chloride, ethylaluminum dichloride, titanium tetrachloride, antimony pentaflouride, and the like. Such carbocationic polymerization catalysts have many advantages, including high yield, fast reaction rates, good molecular weight control, and utility with a wide variety of monomers. However, conventional carbocationic polymerization processes typically employ Lewis Acid catalysts in unsupported form. Hence, these catalysts, typically, cannot be recycled or reused in a cost effective manner.

In a typical carbocationic polymerization process, such as the carbocationic polymerization of isobutylene, a catalyst feedstream in a liquid or gaseous form and a monomer feedstream are fed simultaneously into a conventional reactor. In the reactor, the streams are intermingled and contacted under process conditions such that a desired fraction of the monomer feedstream is polymerized. Then, after an appropriate residence time in the reactor, a discharge stream is withdrawn from the reactor. The discharge stream contains polymer, unreacted monomer and catalyst. In order to recover the polymer, the catalyst and unreacted monomer must be separated from this stream. Typically, there is at least some residue of catalyst in the polymer which cannot be separated. After separation, the catalyst is typically quenched and neutralized. The quenching and neutralization steps tend to generate large quantities of waste which typically must be disposed of as hazardous waste.

The recycling or reuse of Lewis Acid catalysts used in polymer processes is difficult because of the chemical and physical characteristics of these catalysts. For example, most Lewis Acid catalysts are non-volatile and cannot be distilled off; and some Lewis Acid catalysts are gaseous, such as $BF_3$. The gases can be recycled and reused, but with considerable difficulty, by utilizing gas-liquid separators and compressors.

Accordingly, it would be desirable to avoid using gaseous, liquid or soluble Lewis Acid catalysts of this type and to employ a supported or immobilized catalyst on which initiation could take place, and which can be recovered from the reaction system by filtration.

A problem in the search for suitable supported Lewis Acid catalysts is that they typically leach out or otherwise disassociate from the support during use since the catalysts tend not to be fixed firmly to supporting substrates. This can result in the catalyst being consumed during use, as well as contamination of the reaction products.

Even so, supported or immobilized catalysts have been studied for use in various reactions, such as the carbocationic polymerization of olefins. For example, Sket et al (B. Sket et al, J. Makromol. Sci.-Chem., A19(5), 643 (1983)) studied supported catalyst systems comprising boron trifluoride complexed with the aromatic rings of crosslinked poly(styrene) and poly(vinylpyridine). Similarly, Neckers et al (D. C. Neckers et al, J. Am. Chem. Soc. 94(26), 9284 (1972)) studied complexes between aluminum trifluoride and crosslinked poly (styrene)-divinylbenzene, and Chung et al (in copending application Ser. No. 723,130, filed Jun. 28, 1991) disclosed the use of Lewis Acid catalyst systems comprising a Lewis Acid, preferably based on metals from Group III A, IV B and V B of the Periodic Table of Elements, supported on a functionalized thermoplastic copolymer such as polypropylene-co-1-hexenyl-6-ol. The supported catalysts described in the Chung et al application typically will have a particle-like structure wherein each particle consists of an immobile crystalline copolymer backbone phase and a substituent Lewis Acid phase, with the substituent Lewis Acid phase tending to predominate on the surface of the particle. However, the polymer supported Lewis Acid catalysts of Chung et al also may be prepared in various molded or extruded shapes, such as column packing rings and the like, or as coatings on a variety of supporting surfaces such as metal, ceramic, plastics including thermoplastics, glass, graphite and the like.

The concept of performing cationic polymerizations of olefin monomers in the presence of polymer supported Lewis acid catalysts has been studied by other workers as well. See, for example, Y. A. Sangalov et al, Dokl. Akad. Nauk. SSSR, 265(3), 671 (1982). In all these cases, it can be considered that the catalysts are at least partially soluble in the reaction medium, but that they are immobilized due to the fact that they are complexed to an aromatic nucleus or to a functional group borne on a polymer support. As indicated above, a disadvantage of such polymer supported or immobilized Lewis Acid catalysts is that the reaction complexation involved in the immobilization of the Lewis Acid on the polymer support is more or less reversible such that the Lewis acid can be released from the support and into the polymerization products, even if the release process is slow.

In addition to immobilizing Lewis Acids on polymer supports, there have been numerous teachings directed to supporting Lewis Acid catalysts on the surface of inorganic substrates such as silica gel, alumina, graphite and clay. Although these approaches are somewhat successful in recycling the Lewis Acid catalysts, there are several disadvantages associated with their use. One particularly strong disadvantage is that supported catalysts of this type generally produce only low molecular weight oligomers. Another disadvantage is that the catalysts (supported on inorganic substrates) typically leach out during the reaction since the catalysts tend to not be fixed firmly to the supporting substrates.

Patents which describe Lewis Acids supported on an inorganic substrate may be exemplified as follows:

U.S. Pat. No. 3,255,167 discloses olefin polymerization in the presence of reduced titanium halide supported on gamma-alumina. The catalyst is prepared by impregnating gamma alumina with titanium tetrachloride and subjecting the impregnated composition to reducing conditions, for example, by passing hydrogen gas through the impregnated alumina under elevated temperature conditions.

U.S. Pat. No. 3,721,632 discloses a catalyst comprising a metal halide based on metals of Group I A, I B, II B, III B and VIII A on a support such as diatomaceous earth, charcoal, alumina, silica, or silica-alumina.

U.S. Pat. No. 4,112,011 discloses a catalyst comprising gallium compounds on a suitable support such as aluminas, silicas and silica-aluminas.

U.S. Pat. No. 4,116,880 discloses a catalyst comprising a fluorinated graphite support having certain Lewis Acids bonded thereto. The Lewis Acids are selected from the halides of the metals of Group II A, III A, IV B, V A, V B or VI B.

U.S. Pat. Nos. 4,288,649, 4,306,105, 4,582,818 and 4,542,301 disclose halided alumina catalysts which are useful for the various hydrocarbon conversion reactions, as well as for the polymerization of olefins. The catalysts typically are prepared by contacting an alumina support with a halogenating agent such as chlorine gas, thionyl chloride or phosgene at elevated temperatures.

U.S. Pat. No. 3,629,150 discloses catalysts suitable for polymerizing isobutene, wherein the catalysts are prepared by reacting dehydrated silica having silanol groups with aluminum alkyl, and then with a hydrogen halide or with an alkyl halide.

U.S. Pat. Nos. 3,925,495 and 3,984,352 and British Pat. Application GB 2,001,662 A disclose catalysts consisting of graphite having a Lewis Acid intercalated in the lattice thereof.

U.S. Pat. No. 4,235,756 discloses a catalyst comprising porous gamma alumina impregnated with an aluminum hydride.

U.S. Pat. Nos. 4,719,190, 4,798,190 and 4,929,800 disclose hydrocarbon conversation and polymerization catalysts prepared by reacting a solid adsorbent containing surface hydroxyl groups with certain Lewis Acid catalysts in halogenated solvent. The only disclosed adsorbents are inorganic; namely, silica alumina, boron oxide, zeolite, magnesia and titania.

In all cases where a Lewis Acid is supported on an inorganic support, however, there is a risk either of leaching of the catalyst from the support or of loss of activity of the catalyst due to the reaction (or interaction) responsible for the fixation of the active species on the support.

It is known that some solids exhibit Lewis acidity so that it is possible to initiate carbocationic polymerization on their surface. For example, solid superacids such as $SO^{2-}/Fe_2O_3$ or $SO_4^{2-}/TiO_2$ were reported to be active for the polymerization of alkyl vinyl ethers (M. Hino et al, Chem. Lett. (1980, 963). However, it seems that these catalysts owe their activity to the presence of sulfur atoms with covalent SO double bonds (K. Tanabe et al, Successful Design of Catalysts, p. 99, T. Inui Ed., Elsevier Sci. Publish. Amsterdam (1988)). Polymerization catalysts of this type tend to lose their activity, and more importantly they are active at too high a temperature to be used for the polymerization of olefin monomers such as isobutylene and 1-butene. Moreover, the fact that such superacid catalysts might effectively initiate vinyl ether polymerization does not necessarily imply that they might actively initiate the polymerization of other olefin monomers, such as 1-olefins, since the 1-olefins generally are less reactive than vinyl ethers.

U.S. Pat. No. 4,116,880, which has been discussed hereinabove, also discusses superacid catalysts which are supported, for example, on fluorinated alumina, on inert polyfluorinated polymer supports such as polytetrafluoroethylene (Teflon), or on fluorinated polycarbon (coke).

European Pat. No. 273,627 discloses that granular aluminum trichloride was found to be active as a polymerization catalyst. It was also disclosed by Collomb et al, in Europ. Polym, J., 16(2), 1135 (1980), that certain transition metal perchlorates and trifluoromethanesulfonates were active for the cationic polymerization of isobutylene. However, the Collomb et al investigation of heterogenous catalyst systems was limited to salts of metals of the first triad of Group VIII A, i.e. Fe, Ni and Co, and of Groups I A, I B, II A, II B, and III B. It was also noted by Collomb et al that water was detrimental to the polymerization initiating activity.

Marek et al (M. Marek et al, Makromol. Chem. Symp. 13/14, 443 (1988)) reported that the combination of ferric chloride with boron trichloride, titanium tetrachloride or vanadium oxychloride proved to be active for catalyzing the polymerization of olefins. However, Marek et al specified that the activity only concerns polymerization in solution initiated by the soluble fraction of the various initiator systems.

The use of solid state, unsupported catalysts comprising a salt of a strong acid and a Group III A–IV A transition metal is described in our copending application Ser. No. 08/064, 688, filed on May 20, 1993 HETEROGENEOUS LEWIS ACID-TYPE CATALYSTS).

U.S. Pat. Nos. 4,734,472 and 4,751,276 disclose a method for preparing functionalized (e.g., hydroxyl functionalized) alpha-olefin polymers and copolymers derived from a borane containing intermediate.

U.S. Pat. No. 4,167,616 discloses polymerization with diborane adducts or oligomers of boron-containing monomers.

U.S. Pat. No. 4,638,092 discloses organo-boron compounds with strong aerobic initiator action to start polymerizations.

U.S. Pat. No. 4,342,849 discloses novel telechelic polymers formed by hydroborating diolefins to polyboranes and oxidizing the polymeric boranes to form the telechelic dehydroxy polymer. No use of the resulting polymer to support Lewis Acid catalysts is disclosed.

U.S. Pat. No. 4,558,170 discloses a continuous cationic polymerization process wherein a cocatalyst is mixed with a monomer feedstream prior to introduction of the feedstream to a reactor containing a Lewis Acid catalyst.

U.S. Pat. No. 4,605,808 discloses a process for producing polyisobutene using a complex of boron trifluoride and alcohol as catalyst.

U.S. Pat. No. 4,139,417 discloses amorphous copolymers of mono-olefins or mono-olefins and non-conjugated dienes with unsaturated derivatives of imides. In the preparation of the polymer the imide is complexed with a Lewis Acid catalyst.

Japanese Patent Application No. 188996/1952 (Laid Open No. J59080413A/1984) discloses a process for preparing a copolymer of an olefin and a polar vinyl monomer which comprises copolymerizing an olefin with a complex of the polar vinyl monomer and a Lewis Acid.

European Patent Application No. 87311534.9 (Publication No. EPA 0274912) discloses polyalcohol copolymers made using borane chemistry.

T. C. Chung and D. Rhubright, *Mackromolecules*, Vol. 24, 970–972, (1991) discloses functionalized polypropylene copolymers made using borane chemistry.

T. C. Chung, *Journal of Inorganic and Organometallic Polymers*, Vol. 1, No. 1, 37–51, (1991) discloses the preparation of polyboranes and borane monomers.

Lewis Acids useful as catalysts in carbocationic processes as well as carbocationically polymerizable monomers and the polymers produced from such processes are disclosed and described in the following publications: 1) *Cationic Polymerization of Olefins: A Critical Inventory*, Kennedy, Joseph P., John Wiley & Sons, New York (1975) and 2) *Carbocationic Polymerization*, Kennedy, Joseph P., John Wiley & Sons, New York (1982).

In spite of the advances made in the field of polymerization catalysis, there has been a continuous search for catalysts having high efficiency which can be recycled or reused in cationic polymerization processes. The present invention was developed pursuant to this search.

SUMMARY OF THE INVENTION

In accordance with one aspect of the present invention, there is provided an immobilized Lewis Acid catalyst having high crystallinity and high mechanical strength, which catalyst is active for various hydrocarbon conversion reactions, including, in particular, carbocationic olefin polymerization reactions. According to this aspect, the immobilized or supported Lewis Acid catalyst is in the form of porous thermoplastic polymer substrate having catalytically active Lewis Acid sites located at the surface of the pores thereof. The porous substrate, e.g., porous film, which is to be used as the catalyst support may be prepared, for example, by phase-inversion solution casting (PISC) or thermally-induced phase separation (TIPS) processes which involve the leaching out one of the components of a polymer mixture which includes a non-leachable component to which the Lewis Acid is to be attached. The resulting porous polymeric substrate, after being contacted with a Lewis Acid to fix the Lewis Acid to functional sites at the surface of the pores, may be characterized as a blend of polymers A and B, wherein A is a polymer having units characterized by the formula I

and B is a polymer having units characterized by at least one of the formulas II and III

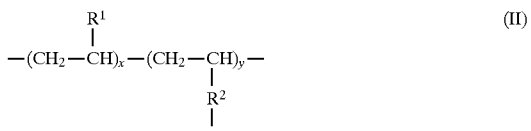

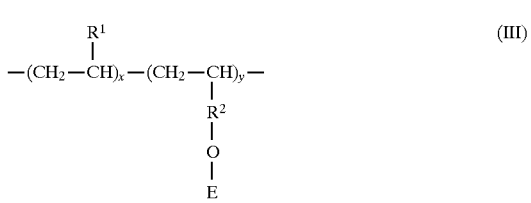

where

R$^1$ represents hydrogen, $C_1$–$C_{24}$ alkyl (e.g., more typically $C_1$–$C_{12}$, preferably $C_1$–$C_4$), $C_3$–$C_{24}$ cyclo alkyl, $C_6$–$C_{18}$ aryl or $C_7$–$C_{30}$ alkylaryl;

R$^2$ represents $C_1$–$C_{24}$ alkyl (e.g., more typically $C_3$–$C_{24}$, preferably $C_3$–$C_5$), $C_3$–$C_{24}$ cyclo alkyl, $C_6$–$C_{18}$ aryl or $C_7$–$C_{30}$ alkylaryl;

R$^3$ represents $C_1$–$C_{24}$ alkyl (e.g., more typically $C_1$–$C_{12}$, preferably $C_1$–$C_4$), $C_3$–$C_{24}$ cyclo alkyl, $C_6$–$C_{24}$ aryl or $C_7$–$C_{30}$ alkylaryl;

E is the residue of the reaction of at least one Lewis Acid with a functional group selected from OH, halide, NH$_2$, NHR$^3$, OM' or OM";

M' represents alkali metal;

M" represents alkaline-earth metal; and x and y represent the mole % of each respective subunit, the sum of x+y being 100%.

Typically, x would range from about 20 to about 99.5 mole %, more typically from about 50 to about 99 mole %, and preferably from about 90 to about 97 mole %. Typically, y would range from about 0.5 to about 80 mole %, more typically from about 1 to about 50 mole %, and preferably from about 3 to about 10 mole %.

The catalysts can be used to produce both high and low molecular weight polymers typically, surprisingly and unexpectedly, at relatively high reaction temperatures.

Another aspect of the present invention provides a process for using the above immobilized Lewis Acid catalyst.

In a preferred embodiment of this aspect, there is provided a process for polymerizing a variety of monomers into homopolymers and copolymers, e.g., polyalkenes, by contacting the monomers with the porous polymer-supported catalysts of this invention under carbocationic polymerization conditions. The monomers which may be polymerized according to this aspect of the invention include those having unsaturation which are conventionally polymerizable using carbocationic Lewis Acid catalyst polymerization techniques, such as, for example, olefins characterized by the presence in their structure of the group >C=CH$_2$. To effect the process, at least one inlet stream comprising monomer feed to be polymerized is fed to a reactor having at least one discharge stream. The monomer feed is polymerized in the reactor in the presence of the above-described immobilized Lewis Acid catalyst. The resulting polymerized polymer is removed from the reactor along with unreacted monomers in the discharge stream while the immobilized catalyst is retained in the reactor.

Yet another aspect of the present invention provides a process for manufacturing the above-described immobilized Lewis Acid catalyst.

The catalysts and processes of the present invention offer a number of advantages over conventional cationic catalysts and polymerization processes.

A significant advantage of such catalysts is that they are characterized by high mechanical strength such that they maintain their porous structure and physical integrity during reaction condition, e.g., when undergoing agitation. The catalysts are also quite stable and do not leach or otherwise deposit free Lewis Acid into the reaction medium or, more importantly, into the reaction products. Another advantage is that the present catalysts are usable for multiple polymerization cycles (in the context of a batch process) without regeneration, resulting in substantial cost savings, as well as the elimination of significant amounts of hazardous waste typically generated in conventional Lewis Acid processes. Not only can the porous supported Lewis Acid catalysts of the present invention be employed for multiple polymerization cycles, or on a continuous basis for extended polymerization times, but they can also be recovered readily from the polymerization products by simple filtration techniques.

Another surprising and unexpected advantage of the present invention is that cationic polymerization processes, utilizing the present porous supported catalysts, can typically be operated, depending upon the desired molecular weight of the polymer, at relatively higher temperatures compared to polymerization processes using conventional Lewis Acid catalysts. For example, conventional carbocationic polymerization processes for polybutene require temperatures in the range of −10° C. to +10° C. to produce polymers having $\overline{M}_n$ of about 500 to 3,000, thus requiring extensive refrigeration systems which are costly to operate. The processes of the present invention can be run at a much wider range of temperatures and temperatures as high as about +50° C. may be employed. Temperatures on the order of −50° C. to about +40° C., e.g. from about −10° C. to about +20° C., are typical.

Yet another surprising and unexpected advantage of the present invention is that gaseous catalysts such as $BF_3$ can now be immobilized. It is now possible to utilize $BF_3$ in a cationic process in a solid form by using the immobilized catalysts of the present invention. The benefits of $BF_3$ can now be realized without the hazards and environmental liabilities that are attendant with the use of gaseous $BF_3$. For example, a by-product of gaseous $BF_3$ in a cationic process is HF. Moreover, it is extremely difficult to recycle gaseous $BF_3$ since the $BF_3$ which is separated from a reactor discharge stream contains gaseous monomers which often dimerize or oligomerize during recycle.

Another advantage of the immobilized catalysts of the present invention is that the catalysts are easy to dispose of in an environmentally advantageous manner. The Lewis Acid catalyst, which typically contains metals, can be stripped from the immobilized catalyst leaving behind a functionalized copolymer e.g., a thermoplastic copolymer. A thermoplastic copolymer can then be disposed of substantially without metal contamination.

Still another advantage of the Lewis Acid catalysts of the present invention is that they can be used in most polar or non-polar organic solvents. The immobilized catalysts do not require that their use be limited to specific solvents, for example, halogenated solvents.

Still yet another advantage of the immobilized catalysts of the present invention is that they may be regenerated in situ, e.g., in a reactor by washing with an acid and then treating with at least one Lewis Acid reagent.

The regeneration process is quite simple and can be done at relatively low temperatures (even ambient temperatures) in the reactor vessel without having to remove the immobilized catalyst from the reactor vessel. It is believed that in situ regeneration is not practical with Lewis Acid catalyst supported on inorganic substrates because of the number and nature of steps involved.

Yet another advantage of the immobilized Lewis Acid catalysts of the present invention is that minimal amounts of catalyst residues carry over to the polymer product. In comparison to a typical "once through" cationic catalyst process, the polymers produced using the immobilized catalysts and processes of the present invention are virtually free of catalyst residues.

The foregoing and other features and advantages of the present invention will become more apparent from the following description and drawings.

DETAILED DESCRIPTION OF THE PREFERRED EMBODIMENTS

Figure 1:
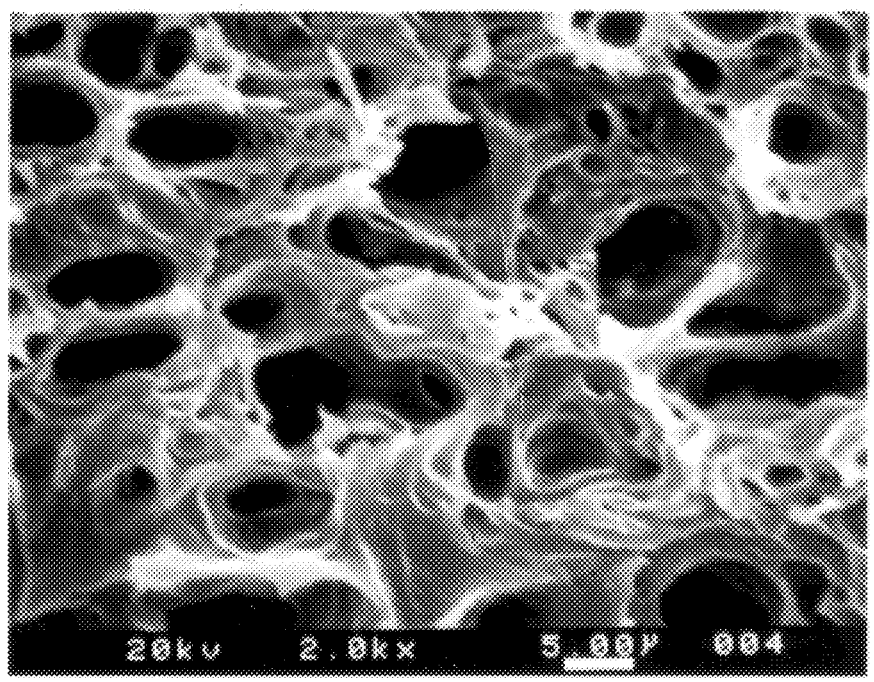
FIG. 1 is a photograph, taken through a scanning electron microscope, of a cross-section of the porous film of polypropylene/hydroxylated polypropylene (PP/PP—OH) prepared in Example 2.

The novel immobilized catalysts of the present invention can be used to polymerize a variety of monomers into homopolymers and copolymers, e.g., polyalkenes. The monomers include those having unsaturation which are conventionally polymerizable using carbocationic Lewis Acid catalyst polymerization techniques, and monomers which are the equivalents thereof. The terms cationic and carbocationic are used interchangeably herein. Olefin monomers useful in the practice of the present invention are polymerizable olefin monomers characterized by the presence of one or more ethylenically unsaturated groups (i.e., >C=C); that is, they can be straight or branched monoolefinic monomers, such as vinyl ethers, ethylene, propylene, 1-butene, isobutylene, and 1-octene, or cyclic or acyclic conjugated or non-conjugated dienes.

Suitable olefin monomers are preferably polymerizable terminal olefins; that is, olefins characterized by the presence in their structure of the group $>C=CH_2$. However, polymerizable internal olefin monomers (sometimes referred to in the patent literature as medial olefins) characterized by the presence within their structure of the group

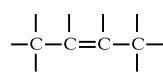

can also be used to form polymer products. When internal olefin monomers are employed, they normally will be employed with terminal olefins to produce polyalkenes which are interpolymers. For purposes of the invention, when a particular polymerized olefin monomer can be classified as both a terminal olefin and an internal olefin, it will be deemed to be a terminal olefin. Thus, 1,3-pentadiene (i.e., piperylene) is deemed to be a terminal olefin for purposes of this invention.

Preferred monomers used in the method for forming a polymer in accordance with the present invention are preferably selected from the group consisting of alpha-olefins and typically $C_3$–$C_{25}$ alpha olefins. Suitable alpha-olefins may be branched or straight chain, cyclic, and aromatic substituted or unsubstituted, and are preferably $C_3$–$C_{16}$ alpha-olefins. Mixed olefins can be used (e.g., mixed butenes).

The alpha-olefins, when substituted, may be directly aromatic substituted on the 2-carbon position (e.g., monomers such as $CH_2$=CH—φ may be employed). Representative of such monomers include styrene, and derivatives such as alpha-methyl styrene, para-methyl styrene, vinyl toluene and its isomers.

In addition, substituted alpha-olefins include compounds of the formula $H_2C$=CH—R—X wherein R represents $C_1$ to $C_{22}$ alkyl, preferably $C_1$ to $C_{10}$ alkyl, and X represents a substituent on R and can be aryl, alkaryl, or cycloalkyl. Exemplary of such X substituents are aryl of 6 to 10 carbon atoms (e.g., phenyl, naphthyl and the like), cycloalkyl of 3 to 12 carbon atoms (e.g., cyclopropyl, cyclobutyl, cyclohexyl, cyclooctyl, cyclodecyl, cyclododecyl, and the like) and alkaryl of 7 to 15 carbon atoms (e.g., tolyl, xylyl, ethylphenyl, diethylphenyl, ethylnaphthyl, and the like). Also useful are bicyclic, substituted or unsubstituted olefins, such as indene and derivatives, and bridged alpha-olefins of which $C_1$–$C_9$ alkyl substituted norbornenes are preferred (e.g., 5-methyl-2-norbornene, 5-ethyl-2-norbornene, 5-(2'-ethylhexyl)-2-norbornene, and the like).

Illustrative non-limiting examples of preferred alpha-olefins are propylene, 1-butene, isobutene, 1-pentene, 1-hexene, 1-octene, and 1-dodecene.

Dienes suitable for purposes of the present invention can be straight chain, hydrocarbon diolefins or cycloalkenyl-substituted alkenes having about 6 to about 15 carbon atoms, for example:

A. straight chain acyclic dienes, such as 1,4-hexadiene and 1,6-octadiene;

B. branched chain acyclic dienes, such as 5-methyl-1,4-hexadiene; 3,7-dimethyl-1,6-octadiene; 3,7-dimethyl-1,7-octadiene; and the mixed isomers of dihydromyricene and dihydro-ocinene;

C. single ring cyclic dienes, such as 1,3-cylcopentadiene; 1,4-cyclohexadiene; 1,5-cyclo-octadiene and 1,5-cyclododecadiene;

D. multi-ring cyclic fused and bridged ring dienes, such as tetrahydroindene; methyl-tetrahydroindene; dicyclopentadiene; bicyclo-(2.2.1)-hepta-2,5-diene; alkenyl, alkylidene, cycloalkenyl and cycloalkylidene norbornenes, such as 5-methylene-2-norbornene, 5-isopropylidene-2-norbornene, 5-(4-cyclopentenyl)-2-norbornene, 5-cyclohexylidene-2-norbornene, and 5-vinyl-2-norbornene;

E. cycloalkenyl-substituted alkenes, such as allyl cyclohexene, vinyl cyclooctene, allyl cyclodecene, vinyl cyclododecene.

Of the non-conjugated dienes typically used, the preferred dienes are dicylcopentadiene, methyl cyclopentadiene dimer, 1,4-hexadiene, 5 methylene-2norbornene, and 5-ethylidene-2-norbornene. Particularly preferred diolefins are 5-ethylidene-2-norbornene and 1,4-hexadiene.

The polymers and copolymers which can be manufactured by the process of the present invention are those which can be manufactured by a carbocationic polymerization process and include but are not limited to polyalkenes, such as polyisobutene, poly(1-butene), polystyrene, ethylene alpha-olefin copolymers, and the like. The term copolymer as used herein is defined to mean a polymer comprising at least two different monomer units.

In particular, the immobilized catalysts of the present invention are especially useful for manufacturing polyisobutene and poly(1-butene) from feedstreams containing butene monomers. It is especially preferred to use refinery feed streams containing $C_4$ monomers, commonly referred to as Raffinate I and Raffinate II.

The Lewis Acids which can be immobilized as described herein to make the catalysts of the present invention are defined herein to include any of those Lewis Acids known in the art to be capable of cationically polymerizing olefins in accordance with conventional techniques, and equivalents thereof. Suitable Lewis Acids typically include the halides and alkyl compounds of the elements in Groups IV B to XVIII B and III A to VI A of the Periodic Table of the Elements including alkyl aluminum, aluminum halides, boron halides, transition metal halides, and combinations thereof. It is particularly preferred to use $BF_3$, $BCl_3$, $FeCl_3$, $SnCl_4$, $SbCl_5$, $AsF_5$, $AsF_3$, $TiCl_4$ and $AlR_nX_{3-n}$ wherein n is an integer from 0 to 3, R is $C_1$–$C_{12}$ alkyl or aryl, and X is a halide, for example, $Al(C_2H_5)_3$, $Al(C_2H_5)_2Cl$, $Al(C_2H_5)Cl_2$, and $AlCl_3$.

The preferred catalysts are Lewis Acids based on metals from Group III A, V A, IV B and V B of the Periodic Table of the Elements, including, but not limited to, boron, aluminum, gallium, indium, titanium, zirconium, vanadium, arsenic, antimony, and bismuth. The Group III A Lewis Acids have the general formula $R_nMX_{3-n}$ wherein M is a Group III A metal, R is a monovalent hydrocarbon radical selected from the group consisting of $C_1$ to $C_{12}$ alkyl, aryl, alkylaryl, arylalkyl and cycloalkyl radicals, n is a number from 0 to 3, and X is a halogen independently selected from the group consisting of fluorine, chlorine, bromine, and iodine. Non-limiting examples include aluminum chloride, aluminum bromide, boron trifluoride, boron trichloride, ethyl aluminum dichloride ($EtAlCl_2$), diethyl aluminum chloride ($Et_2AlCl$), ethyl aluminum sesquichloride ($Et_{1.5}AlCl_{1.5}$), trimethyl aluminum, and triethyl aluminum. The Group IV B Lewis acids have the general formula $MX_4$, wherein M is a Group IV B metal and X is a ligand, preferably a halogen. Non-limiting examples include titanium tetrachloride, zirconium tetrachloride, or tin tetrachloride. The Group V B Lewis Acids have the general formula $MX_z$, wherein M is a Group V B metal, X is a ligand, preferably a halogen, and z is an integer from 3 to 5. Non-limiting examples include vanadium tetrachloride and antimony pentafluoride. The Lewis Acid which is immobilized in accordance with the present invention will preferably be used during immobilization in gaseous or liquid form, either neat or as a solution using organic solvents. The Lewis Acid may be used singly (i.e., one particular Lewis Acid catalyst) or in combination (i.e., two or more Lewis Acid catalysts).

Typical of Lewis Acids useful in the practice of the present invention are those having the formula $MX_{m'}(R^{5'})_{p'}$ as illustrated in the Table, wherein m'=(the coordination of number of M)—(p'+1); p'=0 to 3; and $R^{5'}$ is $C_1$–$C_{12}$ alkyl, $C_6$–$C_{18}$ aryl, $C_7$–$C_{19}$ alkylaryl, and $C_3$–$C_{15}$ cyclic or acyclic.

TABLE

| M  | X      | m' | $R^{5'}$ | p' |
|----|--------|----|----------|----|
| Sb | Cl     | 5  | —        | 0  |
| Sb | Cl     | 3  | —        | 0  |
| Sb | F      | 5  | —        | 0  |
| Sn | Cl, Br | 4  | —        | 0  |
| V  | Cl     | 4  | —        | 0  |

TABLE-continued

| M | X | m' | R5' | p' |
|---|---|---|---|---|
| Be | Cl | 2 | — | 0 |
| Bi | Cl | 3 | — | 0 |
| Zu | Cl | 2 | — | 0 |
| Cd | Cl | 2 | — | 0 |
| Hg | Cl | 2 | — | 0 |
| As | F | 3 | — | 0 |
| As | F | 5 | — | 0 |
| Nb | F | 5 | — | 0 |
| Ta | F | 5 | — | 0 |
| Ga | Cl, Br | 3 | — | 0 |
| In | Cl, Br | 3 | — | 0 |
| Ti | Br, Cl | 4 | — | 0 |
| Zr | Cl | 4 | — | 0 |
| W | Cl | 5 | — | 0 |
| B | F, Cl, Br, I | 3 | — | 0 |
| Fe | Cl, Br | 3 | — | 0 |
| Al | Cl, Br, I | 3 | — | 0 |
| Al3 | Cl, Br, I | 3 | $C_1$ to $C_{12}$ alkyl, aryl, alkylaryl, cyclic or acyclic | -0 |

Lewis Acids useful as catalysts in carbocationic processes as well as carbocationically polymerizable monomers, and the polymers produced from such processes are disclosed and described in the following publications:
1) *Cationic Polymerization of Olefins: A Critical Inventory*, Kennedy, Joseph P., John Wiley & Sons, New York (1975) and 2) *Carbocationic Polymerization*, Kennedy, Joseph P., John Wiley & Sons, New York (1982).

The immobilized Lewis Acid catalysts of the present invention may be used singly or in combination with cocatalysts. The cocatalysts include materials known in this art such as water, alcohols, Bronsted Acids, for example, anhydrous HF or HCl, and alkyl halides, for example, benzyl chloride or tertiary butyl chloride.

The immobilized catalysts of the present invention are derived from porous polymer films having active or functionalized sites located on the surface of pores as illustrated, for example, in FIG. 1. In one preferred aspect of this invention, the technique for preparing the porous polymer film involves the template leaching process, i.e. the leaching out of one of the components from a polymer mixture. For example, a polymer blend with three components ((A) polypropylene, (B) hydroxylated polypropylene and (C) a leachable component, e.g., polyethylene glycol or phenol) can be obtained in a film form by solution casting or melt molding. The incompatibility of polypropylene and polyethylene glycol or phenol results in a two phase system; one phase consisting mainly of crystalline polypropylene (PP) which is a continuous phase, and a second phase comprising, for example, polyethylene glycol (PEG) or phenol. The hdyroxylated polypropylene (PP—OH) is located at the interfaces between the PP continuous phase and the PEG or phenol phase. The polypropylene segments in the hydroxylated polypropylene are co-crystallized with polypropylene and the hydroxy groups form hydrogen bondings with polyethylene glycol. The polypropylene phase is highly crystalline (high melting point) and insoluble, whereas the second phase of polyethylene glycol or phenol is soluble in water. Therefore, the second phase can be leached out using hot water to form a porous structure whose pore diameter can be controlled by the morphology of the polymer blend. The hydroxylated polypropylene located at interface becomes the surface agent for polypropylene, because the polypropylene segments in PP—OH remain cocrystallized with polypropylene and the hydroxy groups are free and are exactly positioned at the surface of pores.

It will be appreciated that the porous polymer films that are used to prepare the immobilized Lewis Acid catalysts of this invention are not limited to porous films comprised of PP/PP—OH blends, and that, typically, suitable porous films can be represented by A/B wherein A represents unfunctionalized polymer containing repeating monomer units I

wherein $R^1$, which can be the same or different in each respective unit, represents hydrogen or alkyl, typically, $C_1$–$C_{24}$ alkyl, e.g. $C_1$–$C_{12}$ alkyl, preferably $C_1$–$C_4$ alkyl, or cyclo alkyl, typically, $C_3$–$C_{24}$ cyclo alkyl, preferably $C_5$–$C_8$ cyclo alkyl, $C_6$–$C_{18}$ aryl or $C_7$–$C_{30}$ alkylaryl; and B represents functionalized polymer containing repeating monomer units IV

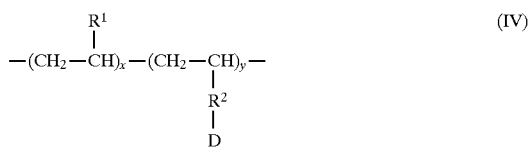

wherein
D, which represents the functional portion of unit B, can be OH, halide, $NH_2$, $NHR^3$, OM', or OM''
$R^2$, which can be the same or different, represents alkyl, typically $C_1$–$C_{24}$ alkyl, e.g., $C_3$–$C_{24}$ alkyl, preferably $C_3$–$C_5$ alkyl, cyclo alkyl, typically $C_3$–$C_{24}$ cyclo alkyl, $C_6$–$C_{18}$ aryl, or alkaryl, typically $C_7$–$C_{30}$ alkylaryl;
$R^3$, which can be the same or different, represents alkyl, typically $C_1$–$C_{24}$ alkyl, e.g., $C_1$–$C_{12}$ alkyl, prefereably $C_1$–$C_4$ alkyl, cyclo alkyl, typically $C_3$–$C_{24}$ cyclo alkyl, preferably $C_5$–$C_8$ cyclo alkyl, aryl, typically $C_6$–$C_{18}$ aryl, or alkyaryl, typically $C_7$–$C_{30}$ alkylaryl;
M' represents alkali metal;
M'' represents alkaline-earth metal; and
x and y represent the mole % of each respective subunit, the sum of x+y being 100%.

The functionalized units B typically are prepared from borated copolymers which are then treated to replace the boron with functional groups represented by D. More specifically, sufficient amounts (i.e., sufficient to eventually yield the desired amounts and ratios depicted hereinbelow) of suitable alpha-olefin monomers and suitable borane monomers (as defined hereinafter) are reacted in a suitable reactor using Ziegler-Natta catalysis under sufficient reaction conditions effective to form a borated, preferably thermoplastic, copolymer. The Ziegler-Natta polymerization may be catalyzed with conventional Ziegler-Natta catalysts or equivalents thereof such as $TiCl_3$ AA/Al$(Et)_3$ or a transition metal halide of Groups IV B to VIII B of the Periodic Table of the Elements and a cocatalyst which is an alkyl compound including alkyl halides of a metal of Groups I A to III A of the Periodic Table of the Elements and the like. The abbreviation "AA" used herein is defined to mean "alumina activated". Activated aluminas are widely known and used in adsorption and catalysis because of their large surface area, pore structure, and surface chemistry. They are made by the controlled heating of hydrated aluminas. The activated alumina can be used as a catalyst support. The use of activated alumina as a catalyst support is optional.

Non-limiting examples of alpha-olefin monomers which may be used to prepare the functionalized copolymer intermediates useful to make the immobilized catalysts of the present invention include ethylene and $C_3$–$C_{24}$ alpha-olefin monomers, such as, propylene, 1-butene, 1-pentene, 1-hexene, oligomers, co-oligomers, and mixtures thereof. The alpha-olefin monomers include any monomer, oligomer or co-oligomer polymerizable by Ziegler-Natta catalysis and equivalents thereof.

Suitable borane monomers, from which unit B is derived, will typically be prepared by reacting a diolefin in having the formula $CH_2=CH-(CH_2)_m-CH=CH_2$ (wherein m is about 1 to 10) with a dialkyl borane solution. Non-limiting examples of diolefins include 1,7-octadiene, 1,5-hexadiene, and 1,4-pentadiene. Non-limiting examples of dialkyl borane solutions include 9-borabicyclo[3,3,1]nonane (hereinafter abbreviated as "9-BBN") in tetrahydrofuran, ethyl ether, methylene chloride, and the like. Borane monomers, useful in the practice of the present invention, and methods of preparation, are disclosed in U.S. Pat. Nos. 4,734,472 and 4,751,276 which are incorporated herein by reference. Preferred borane monomers useful in the practice of the present invention will have the following formula:

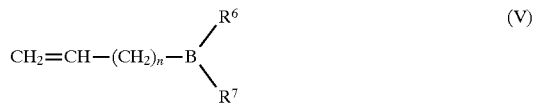  (V)

where n=about 3 to 12 and $R^6$ and $R^7$ are the same or different and are alkyl or cycloalkyl groups having about 1 to 10 carbon atoms. Non-limiting examples of borane monomers include B-7-octenyl-9-BBN, B-5-hexenyl-9-BBN, B-4-pentenyl-9-BBN and the like.

It is necessary to functionalize the borated polymer so that in a later step in the process of this invention, a Lewis Acid catalyst can be chemically bonded to the polymer through the functional groups to form an immobilized catalyst. The functional groups include halide, hydroxy, carboxyl, amino, e.g., $NH_2$ and materials having the formula $NHR^3$, wherein $R^3$ is as defined above.

It is especially preferred to utilize primary functional groups such as hydroxy and halide. The preparation of the functionalized copolymers of the present invention is typically accomplished by replacement (referred to herein as conversion) of borane groups in the borated copolymer with the groups represented by substituent D above by contact with a conversion agent. Suitable conversion agents include hydrogen peroxide/NaOH, $NH_2Cl$, $NH_2SO_3H$, NaI/chloramine-t-hydrate/$CH_3CO_2Na$. It is particularly preferred to use hydrogen peroxide/NaOH when the desired functional group is hydroxyl. The conversion agent and conversion conditions are selected to cleave the boron group from the borated thermoplastic and to substitute a functional group in its place. The extent of conversion determines the amount of functional groups D which can react with Lewis Aid molecules and the eventual number of Lewis Acid residues E which are present at the surface of the pores in the immobilized catalyst.

Optionally, the functionalized polymer may be further reacted with an alkyl alkali metal or alkyl alkaline-earth metal compound to form an alternative functional group more easily reactable with certain Lewis Acids such as $BF_3$, prior to reaction with a Lewis Acid catalyst. These alternative functional groups are depicted when D is OM' or OM".

Examples of alkyl alkali metal and alkyl alkaline-earth metal compounds include butyl lithium, butyl sodium, butyl potassium, and ethyl magnesium. In general, the alkyl alkali metals will have the formula M'R' wherein M' is an alkali metal and R' is a $C_1$–$C_{24}$ alkyl group. The alkali metals (Group I A of the Periodic Table) include lithium, sodium, potassium, rubidium, cesium and francium. In general the alkyl alkaline-earth metal compounds will have the formula M"R" wherein M" is an alkaline-earth metal and R" is a $C_1$–$C_{24}$ alkyl group. The alkaline-earth metals (Group II A of the Periodic Table of the Elements) include calcium, barium, magnesium, strontium and rhodium. Thus, the term functionalized polymer as used herein is intended to include functionalized polymers which are further reacted with an alkyl alkali or alkaline-earth metal compounds.

A typical reaction sequence for the preparation of a functionalized polymer portion of the A/B polymer blend, from alpha-olefin monomers and borane monomers, e.g. functionalized polypropylene copolymer having hydroxy functionality and halide functionality, is as follows:

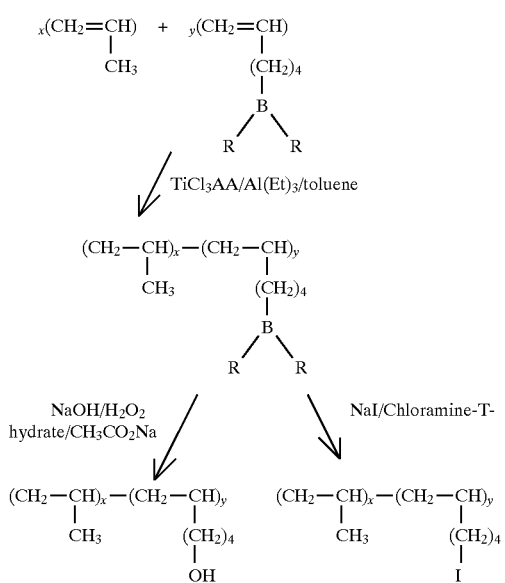

The term "AA" has been previously defined to mean alumina activated and the subscripts x and y have been previously defined to mean the mole % of each respective monomer or subunit, the sum of x+y being 100%.

The functionalized polymers are typically synthesized to be insoluble in common organic solvents at room temperature and stable under typical cationic polymerization conditions. The functionalized polymers will typically have a number average molecular weight ($M_n$) in the range between 300 to 1,000,000.

The immobilized catalysts of the present invention will typically be prepared from a blend of unfunctionalized polymer A, functionalized polymer B and leachable component C which is incompatible with polymers A and B in the sense that a blend of polymers A, B and component C can be formed into a film having a first continuous phase consisting primarily of polymers A and B and a second phase consisting primarily of discrete areas or structures e.g., small spheres or cylindrical rods, of component C. In one preferred embodiment of the invention, polymer A comprises a polyolefin such as polypropylene (PP), polymer B comprises a functionalized polyolefin such as hydroxylated polypropylene (PP—OH), and component C comprises a polymer such as polyethylene glycol (PEG) which is soluble in hot water. The polymers A and B and component C can be blended and formed into a non-porous film by solution casting or melt molding. The incompatibility of the polypropylene (and hydroxylated polypropylene) with the polyethylene glycol results in a film having two distinct phases, one phase consisting mainly of crystalline polypropylene (and hydroxylated polypropylene) and a second phase consisting primarily of discrete areas or structures, e.g., spheres, of polyethylene glycol. The polypropylene (and hydroxylated polypropylene) phase, which is a continuous phase, surrounds the polyethylene glycol phase with the hydroxylated polypropylene being located at the interfaces between the crystalline polypropylene and the polyethylene glycol. The polypropylene segments which are present in the hydroxylated polypropylene are co-crystallized with polypropylene in the continuous phase and the hydroxy groups in the hydroxylated polypropylene form hydrogen bondings with the polyethylene glycol spheres. The continuous (polypropylene) phase is highly crystalline (and of high melting point) and is insoluble in most polar and non-polar solvents, including hot water, whereas the polyethylene glycol phase is soluble in hot water. Therefore, the polyethylene glycol phase can be leached out of the film selectively by using hot water as a solvent, thereby resulting in the formation of a porous polypropylene/hydroxylated polypropylene film having hydroxy groups which are capable of reacting with and thereby immobilizing a Lewis Acid.

It will be appreciated that the pore diameter of the polypropylene/hydroxylated polypropylene film can be controlled by the morphology of the polymer blend. However, the porous films prepared in accordance with the present invention typically are characterized by a wide range of pore diameters, e.g., ranging from as low as about 0.01 $\mu$m and as high as about 150 $\mu$m. Typically, films having pore sizes ranging from about 0.2 to about 50 $\mu$m are obtained, with films having pore sizes on the order of from about 0.5 $\mu$m to about 20 $\mu$m being preferred.

As indicated previously, the functionalized polymer B, e.g. the hydroxylated polypropylene, is located at the interface between the continuous phase polymer A, e.g. polypropylene, and the incompatible, component C phase, e.g. polyethylene glycol. Accordingly, after component C has been leached or otherwise removed from the film, the functionalized polymer B becomes the surface agent for the unfunctionalized polymer A, because the crystalline segments in the polymer B remain cocrystallized with the crystalline polymer A while the functional groups, e.g., the hydroxy groups, become free functional groups at the surface of the newly created pores which are formed by the removal of component C from the film.

The porous A/B polymer film, with its functional groups at the surface of the pores is used as the substrate for the immobilized Lewis Acid catalysts of the present invention. The immobilization of the Lewis Acid on the porous film substrate is accomplished simply and effectively under mild reaction conditions. Typically, a sufficient amount of at least one Lewis Acid catalyst, preferably in excess, is mixed with a sufficient amount of the functional group-containing A/B porous polymer film in a suitable reactor vessel under suitable reaction conditions effective to react the functionalized porous film with the Lewis Acid thereby producing the desired immobilized catalyst. By "excess" is meant a molar ratio of Lewis Acid catalyst to functional groups of about more than 1:1, preferably 5:1. The reaction is preferably carried out at a temperature of about 20° C. to 50° C. although the reaction temperature may range from about −50° C. to 100° C. The reaction is preferably carried out by dissolving the Lewis Acid catalyst in a thoroughly dried, inert solvent selected from any suitable solvents including alkanes, aromatic solvents and alkyl halides; however, the Lewis Acid catalyst may be in the gas phase or liquid phase when reacted with the functionalized copolymer. The preferred solvents will be good solvents for the Lewis Acid catalyst and will also be relatively good solvents (swellable) for the polymer substrate to maximize the penetration of reagent into the polymer matrix.

The resulting immobilized Lewis Acid catalysts of the present invention can be described as comprising a porous polymer film having a Lewis Acid catalyst immobilized or fixed to the film at sites located at the surfaces of the pores. Thus, as indicated previously, the immobilized catalyst may be characterized as comprising a porous film composed of polymers A and B, wherein polymer A contains repeating monomer units having the structure formula I

and polymer B contains units characterized by at least one of the formulas II and III

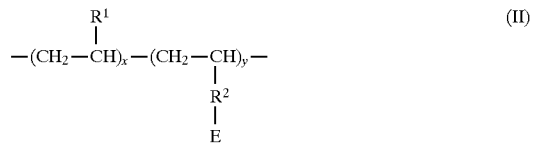

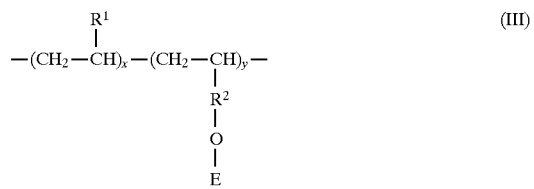

where $R^1$ represents hydrogen, $C_1$–$C_{24}$ alkyl, (e.g., more typically $C_1$–$C_{12}$, preferably $C_1$–$C_4$), $C_3$–$C_{24}$ cyclo alkyl, $C_6$–$C_{18}$ aryl or $C_7$–$C_{30}$ alkylaryl;

$R^2$ represents $C_1$–$C_{24}$ alkyl (e.g., more typically $C_3$–$C_{24}$, preferably $C_3$–$C_5$), $C_3$–$C_{24}$ cyclo alkyl, $C_6$–$C_{18}$ aryl, or $C_7$–$C_{30}$ alkylaryl;

E is the residue of the reaction of at least one Lewis Acid with a functional group selected from OH, halide, $NH_2$, $NHR^3$, OM', or OM";

$R^3$ represents $C_1$–$C_{24}$ alkyl (e.g., more typically $C_1$–$C_{12}$, preferably $C_1$–$C_4$), $C_3$–$C_{24}$ cyclo alkyl, preferably $C_5$–$C_8$, $C_6$–$C_{18}$ aryl or $C_7$–$C_{30}$ alkylaryl;

M represents alkali metal;

M" represents alkaline-earth metal; and x and y represent the mole % of each respective subunit, the sum of x+y being 100%.

and wherein the catalytically active residue E, i.e. the residue of the reaction of the Lewis Acid and the functional group D, is located primarily at the surfaces of the pores of the film.

As indicated above, E is defined as being the residue of the reaction of a Lewis Acid catalyst with a functional group of the polymer portion B of the film. Accordingly, it will be appreciated by those skilled in the art that the precise formula for E will vary depending upon the Lewis Acid catalysts used and the functional groups present on the functionalized polymer.

The weight ratio of polymer A to polymer B in the porous film substrates which are reacted with the Lewis Acid to form the catalysts of this invention typically will be about 0:1 to about 500:1, more typically about 0.1:1 to about 50:1, and preferably about 3:1 to about 20:1. Typically, the number of average molecular weight of polymer B is from about 10,000 to about 1,000,000, more typically from about 20,000 to about 500,000, and preferably from about 50,000 to about 300,000. Typically, the number of functional groups on the polymer B is from about 0.05 to about 80 mole %, more typically from about 1 to about 50 mole %, and preferably from about 3 to about 10 mole %. Most of the functional groups are reacted with Lewis Acid catalyst to form catalytically active residue groups E.

Typically, the weight ratio of incompatible component C that is blended with polymers A and B to form the polymer film from which component C is thereafter extracted to form the porous polymer substrate contemplated for reaction with the Lewis Acid is from about 5% to about 90%, more typically from about 10% to about 60%, and preferably from about 30% to about 50%.

It will be appreciated by those skilled in the art that the herein described polymers A and B which comprise the porous substrate to be reacted with the Lewis Acid component, individually may comprise either polymers or copolymers, i.e. polymers comprised of at least two different monomers. Thus, it will be appreciated that it is within the scope of this invention to employ as the substrate for reaction with the Lewis Acid a porous film derived from a polymer blend wherein one of the polymers in the blend comprises a functionalized copolymer of the type described in copending application Ser. No. 723,130, filed Jun. 28, 1991, i.e. a functionalized copolymer having monomer units represented by the formula VI $$[A]_a[B]_d \tag{VI}$$

wherein A represents unfunctionalized monomer unit, and B represents the functionalized monomer unit in the copolymer and wherein A and B are as defined above and a and d represent the mole % of each respective monomer unit A and B in the functionalized copolymer, the sum of a+d being 100 mole %.

The disclosure of copending application Ser. No. 723,130 is incorporated herein by reference.

Although the immobilized catalysts of the present invention comprise a Lewis Acid chemically reacted with and chemically bonded to a porous polymer substrate, there is one instance wherein the bond is a pi ($\pi$) complex. Specifically, when functional groups at the surface of the pores of the substrate are hydroxy groups and when the Lewis Acid intended to replace the hydroxy groups is $BF_3$, then the $BF_3$ will form a pi ($\pi$) bond with the porous film substrate by complexing with hydroxy groups contained at the surfaces of the pores.

The porous polymer film-immobilized Lewis Acid catalysts of the present invention typically will have an asymmetric pore size distribution across the thickness of the film substrate, which thickness typically will vary from about 0.1 mm to about 3 mm, more typically from about 0.2 mm to about 2 mm, preferably from 0.5 mm to about 1 mm.

The size and shape of the present immobilized catalyst, i.e., the length, width and overall shape of the porous substrate may vary widely as desired. For Example, for typical applications the porous support suitably is in the form of a powdered film having a particle diameter on the order of form about 200 $\mu$m to about 1,000 $\mu$m. In other typical applications, the porous support is in the form of a chopped or pelletized film having a particle size on the order of from about 1,000 $\mu$m to about 5,000 $\mu$m. In still other applications, the porous support is in the form of film strips on the order of about 0.5 to 5 mm wide and about 5 to 15 cm in length; and in still further applications, the porous support is in the form of an elongated film.

The porous structure of the present catalyst consists of an immobile porous polymer substrate phase and substituent Lewis Acid phase. While not wishing to be bound to any particular theory, it is believed that the Lewis Acid phase tends to predominate on the surface of the pores of the polymer substrate, while the interior of the substrate will tend to consist primarily of crystalline polymer immobile phase. More specifically, when the borated polymer intermediate is prepared prior to forming the functionalized polymer that is blended with the crystalline unfunctionalized polymer and incompatible polymer preparatory to forming the porous substrate, the difference in reactivity between the borane comonomer (lower activity) and olefin comonomer (higher activity) is believed to result in a predominantly block or sharply tapered copolymer. It is believed that the non-boron containing block is crystalline, since as the block crystalizes, it forms a particle having crystalline regions and amosphous regions. During crystallization the boron monomer block migrates. This orientation phenomena is maintained even upon melt extrusion of the polymers from which the porous support is derived such that the support contains a continuous phase of crystalline polymer and a discrete fugitive phase, with the functionalized polymer concentrated at the interface between the two phases, thereby ensuring predominance of the Lewis Acid sites at the surface of the pores of the porous polymer substrate.

Thus, when the fugitive phase is leached out of the polymer substrate, the functional group-containing polymer is located at the surface of the newly formed pores. This structure results in catalysts having good polymerization activity and high surface area.

The porous immobilized catalysts of the present invention can be separated easily from the reaction mixtures in which they are present, for example, by simple filtration techniques, particularly when the catalyst is in the form of a powdered or chopped film, or when the catalyst is employed in a fluidized bed reactor. When the present immobilized catalysts are employed in a fixed bed reactor, there generally is no need to filter the catalyst from the reactor. In such cases the fixed bed catalysts may be separated from a reaction mixture simply by discharging the reactor contents and leaving the catalyst in place in the reactor.

The porous polymer-supported catalysts of the present invention may be used for prolonged periods of time and then may be regenerated. The catalysts are easily regenerated. The catalyst regeneration may take place after the catalyst has been removed from the reactor or, if desired, the catalyst may be regenerated in situ in a reactor. The regeneration process is preferably accomplished by first washing the porous catalyst, either in the reactor vessel or after it has been separated therefrom, with any Bronsted acid such as HCl, $H_2SO_4$ and the like, and then treating the resulting functional group-containing porous substrate with Lewis Acid reagents. Optionally, after the acid wash, and prior to treatment with the Lewis acid reagent, the porous substrate is treated with an alkyl alkali metal or an alkyl alkaline-earth metal compound to form an intermediate salt which is then treated with Lewis Acid catalyst reagent. Typically, these Lewis Acid reagents will consist of Lewis Acid catalyst solutions in organic solvents such as toluene, methylene chloride and the like. Preferably the strengths of the Lewis Acid catalyst solution will range from about 10 wt. % to about 50 Wt. %. It is preferred to use an excess of Lewis Acid catalyst reagent in the regeneration process. By "excess" is meant from two to five times the mole ratio of catalyst to functional groups. Rather than use solutions of Lewis Acid catalysts, the Lewis Acid catalyst may be used in a liquid or gaseous form.

The porous substrate portion of the present catalysts is stable under cationic catalysis reaction conditions: it is insoluble in common organic solvents below 120° C. and has high mechanical strength.

While the porous polymer substrate of the immobilized catalysts of the present invention can exist as random copolymers, block copolymers, tapered copolymers, graft copolymers and alternating copolymers, it is preferred to use immobilized catalysts of the present invention having a monomer distribution which is described as block or predominantly tapered. It will be appreciated by those skilled in the art that the monomer configuration of the copolymer will affect its chemical and physical properties. The term copolymer as used herein is defined to mean a polymer having two or more monomeric units. The monomeric configuration in the polymer backbone is determined by a number of factors well known to those skilled in this art, including reactivity ratios, rates of monomer addition, sequencing, reactor design, reaction conditions and the like.

The carbocationic polymerization process of the present invention may be carried out in a polar or, preferably, non-polar reaction medium as a continuous, semi-continuous or batch process. Suitable polar solvents which may be used as the polymerization reaction medium include, for example, methyl chloride, dichloromethane, ethyl chloride or nitromethane or the like, whereas suitable non-polar solvents include, for example, carbon tetrachloride, hexane, heptane, cyclohexane, and more generally the linear or branched, saturated or unsaturated hydrocarbon solvents which can be found in the stream of monomers obtained from various cracking processes.

The reactors which may be utilized in the practice of the present invention include conventional reactors and equivalents thereof such as batch reactors, stirred tank reactors, fluidized bed reactors, and continuous tank or tubular reactors and the like. As previously mentioned, the process may be continuous, batch or semi-continuous or combinations thereof.

The reactor will contain sufficient amounts of the porous film-supported catalyst of the present invention effective to catalyze the polymerization of the monomer containing feedstream such that a sufficient amount of polymer having desired characteristics is produced. The reaction conditions will be such that sufficient temperature, pressure and residence time are maintained effective to maintain the reaction medium in the liquid state and to produce the desired polymers having the desired characteristics.

Typically, the catalyst to monomer ratio utilized will be those conventional in this art for carbocationic polymerization processes. In the practice of the present invention, the catalyst monomer ratio is selected based on the ratio of residue E to monomer being polymerized. In the practice of the present invention the mole ratio of the residue E to the monomer will typically be about 1/5000 to about 1/50, more typically about 1/1000 to about 1/100, and preferably about 1/500 to about 1/200. This mole ratio will be calculated by determining the number of Lewis Acid catalyst sites in the immobilized Lewis Acid catalyst. This can be done by using conventional analytic testing techniques such as elemental analysis, NMR (e.g., aluminum NMR) and absorption spectroscopy. Once the number of Lewis Acid sites per unit of immobilized catalyst is known, the mole ratio is calculated in a conventional manner.

The reaction temperature typically will be maintained at about 50° C. to about −50° C., more typically about 40° C. to about −20° C., and preferably about 30° C. to about −10° C. The reaction pressure will typically be about 200 k PA to about 1600 k PA, more typically about 300 to about 1200, and preferably about 400 to about 1000. The degree of polymerization of the monomer feedstream will typically be about 6 to about 10,000, more typically about 10 to about 2,000, and preferably about 10 to about 500.

The monomer feedstock stream to this process may be at least one pure or mixed monomer feedstream or combinations thereof. Preferably, the monomer feedstream may be mixed with solvents such as hexane, methylene dichloride and the like. A preferred feedstock to this process may be a pure or mixed refinery butene stream containing one or more of 1-butene, 2-butene, (cis and trans), and isobutene. The preferred feedstocks (preferred on an availability and economic basis) are available from refinery catalytic crackers and steam crackers. These processes are known in the art. The butene streams typically contain between about 6 wt. % to about 50 wt. % isobutylene together with 1-butene, cis-and trans-2-butene, isobutane and less than about 1 wt. % butadiene. One particularly preferred $C_4$ feedstream is derived from refinery catalytic or steam cracking processes and contains about 6–45 wt. % isobutylene, about 25–35 wt. % saturated butanes and about 15–50 wt. % 1- and 2-butenes. Another preferred $C_4$ feedstream is referred to as Raffinate II characterized by less than about 6 wt. % isobutylene.

The monomer feedstream is preferably substantially anhydrous, that is, it contains less than 50 ppm, and more preferably less than about 30 ppm, and most preferably less than about 10 ppm, by weight of water. Such low levels of water can be obtained by contacting the feedstream, prior to the reactor, with a water absorbent (such as $CaCl_2$, $CaSO_4$, molecular sieves and the like) or by the use of distillation drying. Suitable molecular sieves include 4 to 8 US mesh 3 Angstrom molecular sieves.

The monomer feedstream is typically substantially free of any impurity which is adversely reactive with the catalyst under the polymerization conditions.

For example, the monomer feed to an porous film-supported catalyst should be preferably substantially free of bases (such as caustic), sulfur-containing compounds (such as $H_2S$, COS, and organo-mercaptans, e.g., methyl mercaptan, ethyl mercaptan), N-containing compounds, and the like. Most preferably, the monomer feed contains less than about 10 ppm by weight of sulfur-containing compounds, calculated as elemental sulfur, less than about 10 ppm by weight of caustic, calculated as NaOH. Such low levels of base, sulfur and nitrogen impurities can be obtained by conventual techniques, as by the use of caustic to remove sulfur- and nitrogen-compounds from a refinery $C_4$ stream, followed by water washing to remove caustic, drying with any of the above water absorbents, hydrogenating to remove $C_4$–$C_5$ diolefins (eg., butadienes) (to a level of below 1 wt. %, preferably <1,000 ppm by weight) and cooling the resulting purified $C_4$ stream for feed to the reactors of the present invention, after admixing the selected cocatalyst therewith.

The monomer feedstream is typically substantially free of aromatic compounds) to avoid the resultant reactive degradation of the catalyst. Therefore, use of an aromatic solvent generally is not envisioned in this process.

It is contemplated that this process may be used to polymerize and copolymerize various monomers from pure or mixed feedstreams such as isobutenes from pure or mixed streams (containing other butenes); n-butenes from streams containing small amounts of isobutenes (e.g., less than about 5 wt. %); and sequentially isobutene from a mixed stream, and then n-butenes. It is also contemplated that this process may be used to copolymerize various monomers including 1-butene, ethylene and hexene.

Other design parameters such as recycle rate and % diluents are matters of choice in this instance and may be readily determined by one having ordinary skill in chemical engineering.

A material acting as a cocatalyst (or promoter) may optionally be added to a monomer feedstock before that feed is introduced to a reactor or it may be added separately to the reactor, e.g., to the catalyst bed. As has been pointed out above, a variety of conventional cocatalysts or equivalents can be used including water, inorganic acids such as hydrogen halides, lower alcohols, compounds having the formula ROH and RX wherein X=halide and R=$C_2$–$C_{24}$ secondary or tertiary alkyl, organic acids such as carboxylic acids and sulfonic acids, and the like. For example, gaseous, anhydrous HCl, may be employed as a cocatalyst. The HCl will be employed in a catalytically effective amount, which amount will generally range from about 50 to 5,000 ppm by weight of the monomer feed, preferably 50 to 500 ppm (e.g., 70 to 200 ppm) by weight of the monomer feed when the monomer feed comprises >5 wt. % isobutylene, and preferably from about 100–5,000 ppm (e.g., 400–3,000 ppm) by weight when the feed comprises n-butenes and <5 wt. % isobutylene. If anhydrous HCl is added to the feedstream containing isobutene, t-butyl chloride is formed before contact with the solid catalyst. This has been found to promote the polymerization of the isobutene. Water, in a catalytic amount, may be added to the feedstock, but it is not preferred since it has a tendency to cause physical deterioration of the catalyst with time. Alcohols, such as the preferred lower alkanols (e.g., methanol), also may be added as a cocatalyst. As has been pointed out above, the reaction mixture also preferably is substantially anhydrous (that is, typically contains <50 ppm, more typically <30 ppm, and most preferably <10 ppm, by weight water based on the monomer feed).

The order of contacting the monomer feedstream, catalyst, cocatalyst and solvent is not critical to this invention. Accordingly, the catalyst and cocatalyst can be added to the reactor before or after adding the monomer feedstream and solvent. Alternatively, the catalyst and monomer feedstream can be added before or after adding the cocatalyst and solvent. However, while the order of adding the various materials to the reactor is not deemed to be critical to the practice of this invention, it has been found that more favorable reaction rates are achieved, in cases where the polymerization reaction is carried out in the presence of a non-polar reaction medium, when the order of addition to the reactor is: catalyst, followed by cocatalyst, followed by solvent, followed by monomer feedstream.

The characteristics of the polymeric product of the present process will be dependent upon the monomer feedstream, the selected immobilized catalyst, the optional cocatalyst, and the reaction conditions that are employed. Typically, the number average molecular weight, $\overline{M}_n$, of the polymeric product will range from about 200 to about 1,000,000, more typically about 400 to about 500,000 and preferably about 500 to about 10,000 gm/mole. The polydispersity (PDI), also known as the molecular weight distribution ($\overline{M}_w/\overline{M}_n$) will typically range from about 1.2 to about 5, more typically about 1.5 to about 4, and preferably about 1.5 to about 3. Unexpectedly, a relatively high molecular weight polymer can be produced at or near room temperature. In addition, all molecular weights of polymers can usually be produced at relatively lower temperatures by using the immobilized catalysts of the present invention when compared with conventional carbocationic catalysts.

The product mixture may be withdrawn from the reactor and subsequently treated (e.g., by depressuring into a suitable gas/liquid separation drum or other vessel) for separation of gaseous components therefrom (e.g., unreacted monomer such as isobutene, butene butane, and isobutane). If desired, these separated gases can be compressed, cooled and recycled to the feed inlet to the tubular reactor, although the need for such recycling is minimized or avoided by use of the process of this invention in view of the high olefin conversions which are obtainable. A portion of the liquid reactor effluent can be recycled to the feed to dilute the content of the monomers in the feed to the reactor, if necessary. Preferably, the monomers fed to the reactor are substantially free of monomers recycled from the reactor effluent. Therefore, the monomer feedstream is preferably contacted with the catalyst in the process of this invention on a once-through basis.

In a preferred embodiment of the invention, immobilized Lewis Acid catalysts are prepared from a precursor comprising a porous film of hydroxylated polypropylene (PP—OH) with hydroxy groups located on the surface of pores. Typically, the hydroxylated polypropylene would be prepared by Ziegler-Natta copolymerization of propylene and borane monomer, such as B-5-hexenyl-9-BBN. In general, the borane monomer can be effectively incorporated in polyolefin polymers with controllable concentrations and locations. In turn, the borane groups in copolymers are easily converted to various functional groups despite heterogeneous reaction condition. In a typical reaction, the more reactive propylene would be added gradually in order to keep its concentration lower than that of the borane monomer. The propylene typically would be added in decreasing amounts to account for the consumption of borane monomer in the feed. This approach can produce copolymer with narrow compositional distribution and higher yield of borane monomer. The molecular weights of polymers were determined by intrinsic viscosity which was measured in cone/plate viscometer at 135° C. in decalin solution. To enhance the solubility of the polymers, the hydroxylated polymers were esterified with benzoyl chloride. The viscosity average molecular weights ($\overline{M}_v$) were calculated using the Mark-Houwink equation:

$$[\eta]_o = K(\overline{M}_v)^a$$

where K is 11.0×10−3 (ml/g) and a is 0.80. As shown in Table I, $\overline{M}_v$'s are high, about 200,000 g/mole, for all the runs.

Due to the reactivity difference between propylene and borane monomer, a brush-like microstructure was obtained as shown below:

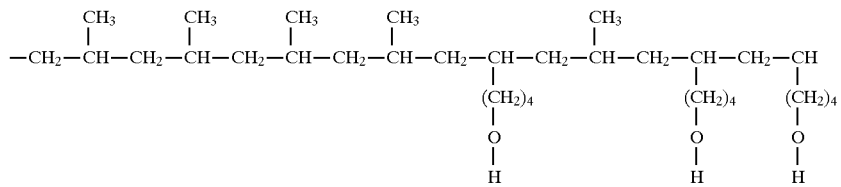

The consecutive sequence of propylene units in the polymer backbone formed a crystalline phase by itself and also formed a cocrystalline phases with pure isotactic polypropylene. On the other hand, the mobile functional groups, located at the end of side chains and concentrated toward the end of polymer backbone, were expelled out to the surface of the crystalline phase.

The high surface area and mobility of the hydroxy groups thus contributed to the important advantages of the immobilized catalysts.

In the preparation of a porous film support in accordance with the present invention, two preferred methods have emerged: namely, phase-inversion solution casting (PISC) and thermally-induced phase separation (TIPS). Both techniques involve the template leaching process, i.e., leaching out one of the components from a polymer mixture. In the PISC method, the process preferably begins with a mixture of polypropylene (PP) and hydroxylated polypropylene (PP—OH) dispersed in a suitable solvent such as xylene or trichlorobenzene. Typically, the weight ratio of PP/PP—OH is between about 0/1 to 500/1, and preferably between 3/1 to 20/1. To this mixture of PP/PP—OH there is added another substance known as a pore forming agent. Typically, the pore forming agent is a polymer such as polyethylene glycol (PEG) or polyvinylpyrrolidone (PVP) or phenol. The quantity of the pore forming agent that is added to the PP/PP—OH mixture has a strong influence on the size of the pores in the final film product. The PP/PP—OH/pore forming agent mixture is then heated about 170° C. to form a homogeneous solution, and the solution is spread in a thin film on a glass surface and the solvent is allowed to begin preevaporating under room temperature and humidity. During the preevaporation of the solvent and cooling of the solution, the initially homogeneous solution becomes a gel. After a predesignated preevaporation time, the gel or film that has formed in immersed into a coagulant (usually water) bath so that the remaining pore forming agent and solvent are removed, and the gel, now a film, is stabilized. Typically, before the film can be further processed in accordance with the invention, it is kept in the coagulant bath for at least 24 hours to ensure complete phase-inversion. After drying, an asymmetrical porous PP/PP—OH substrate is obtained with a highly porous structure on the surface that is exposed to the air and a dense structure on the surface which is in contact with the glass. The pore size can be controlled by controlling the identity and amount of pore forming agent and the cooling process, such that an average pore size of from 0.05 $\mu$m to 20 $\mu$m preferably can be achieved. Overall, this PISC process involves a combination of solvent evaporation, cooling and solvent-nonsolvent exchange.

While the PISC process has its advantages, the recently developed thermally-induced phase separation (TIPS) procedure is perhaps the most versatile and convenient film preparation method. In the TIPS process, a homogeneously mixed solution is formed by melt-blending the polymer solution (PP—OH and PP dissolved in xylene above 170° C.) with an additive (PEG, PVP). The solution is cooled to induce phase separation and gelation of the polymer mixture, and the gel is allowed to lose all of its solvent in a complete evaporation. After depletion of the solvent, the polymer mixture is made into powder and the polymer powder is formed into a melt between a pair of teflon coated aluminum plates at 355° F. After waiting at least 20 minutes to ensure complete melting, the sample is pressed at pressures up to 1000 psi. The melt is cooled to induce phase-inversion and solidification of the polymer mixture. The incompatibility of polypropylene and polyethylene glycol results in a two phase system, one phase consisting mainly of crystalline polypropylene (PP) which is a continuous phase. The second phase is polyethylene glycol (PEG) having a discrete structure, such as spheres. The hydroxylated polypropylene (PP—OH) is located at the interfaces between the crystalline continuous PP phase and the PEG phase. The polypropylene segments in PP—OH are cocrystallized with the PP phase and the hydroxy groups in the PP—OH form hydrogen bondings with the PEG. The PP phase is highly crystalline (high melting point) and insoluble, whereas the second phase of PEG is soluble in hot water. Therefore, the second phase is leached out by hot water and a wide range of pore diameters can be obtained. The PP—OH, which is located at the interface becomes the surface agent with the polypropylene segments of the PP—OH still being cocrystallized with polypropylene and the hydroxy groups being free and exactly positioned at the surface of pores.

The immobilization of Lewis Acid on the porous film is simply obtained by mixing selected Lewis Acid and porous PP/PP—OH film. The Lewis Acid is brought into contact with hydroxy groups on the surface of pores to form metal-oxygen bonds. The most preferred Lewis Acids are $AlR_nX_{3-n}$ (n=0–3), e.g. $Al(C_2H_5)_3$, $Al(C_2H_5)_2Cl$, $Al(C_2H_5)Cl_2$ and $AlCl_3$, $BF_3$, $BCl_3$ and $TiCl_4$. Most of the reactions are conveniently carried out by dissolving the Lewis Acid in a thoroughly dried inert solvent. Alternatively the reaction can be carried out in the gas phase by passing the Lewis Acid vapor (with or without a dry inert gas stream) over a fixed bed of porous PP/PP—OH film. The reaction temperature can vary over wide limits although it is preferred to employ reaction temperatures in the range of –20° to 40° C. The duration of the reaction may vary over a moderately wide range, typically between 0.1 to 12 hours. Typically, excess Lewis Acid used in the reaction and any unreacted Lewis Acid is removed by washing with dry hot solvent inert atmosphere condition. The quantity of Lewis Acid which reacts with hydroxyl groups is basically pre-determined by the number of functional groups in the porous PP/PP—OH film.

As indicated previously, the resulting immobilized Lewis Acid catalysts, which comprise, for example, PP/PP—O—$AlCl_2$ and PP/PP—O—$BF_2$, can be used to catalyst the liquid phase cationic polymerization of olefin monomers, as well as various other hydrocarbon conversion processes, including isomerization processes, hydrogenation processes, oxyhalogenation processes and oxidative dehydration processes.

As previously mentioned, the porous polymer-immobilized catalysts and processes of the present invention offer a number of advantages over conventional carbocationic catalysts and polymerization processes.

A particularly significant advantage of the catalyst and process of the present invention is that the catalyst is usable for prolonged periods of time resulting in significant cost savings, as well as the elimination of significant amounts of hazardous waste typically generated in conventional Lewis Acid processes.

Another surprising and unexpected advantage of the present invention is that the polymerization process can be operated, depending upon the desired molecular weight of the polymer, at relatively higher temperatures, even ambient temperatures.

Yet another surprising and unexpected advantage of the present invention is that gaseous catalysts such as $BF_3$ can now be immobilized.

Yet still another advantage of the immobilized catalysts of the present invention is that the catalysts can be regenerated in situ, for example, by first using an acid wash followed by Lewis Acid reagent.

Another advantage of the immobilized catalysts of the present invention is that the catalysts are easy to dispose of in an environmentally advantageous manner.

Yet another advantage of the catalysts of the present invention is that they can be used in most organic solvents. Although the use of non-polar solvents as the polymerization reaction medium is preferred, the catalysts of this invention do not require that their use to be limited to specific solvents, for example, aliphatic hydrocarbon solvents.

And yet another advantage of the catalysts of the present invention is that the polymers produced using these catalysts have little or no catalyst residue.

Polybutenes and other polymers and copolymers in the molecular weight range of about 300 to about 10,000 prepared in accordance with the process of the present invention are particularly useful as a feedstock for the production of improved lubricating oil dispersant additives. These dispersants generally comprise the reaction product of polybutenyl ($M_n$ of 700 to 10,000) succinic anhydride, or the acid form thereof, with monoamines or polyamines having at least one primary or secondary amino group such as the alkylene polyamines, particularly the ethylene polyamines, the polyoxyalkylene amines, aromatic and cycloaliphatic amines, hydroxyamines, monoaliphatic and dialiphatic substituted amines. Useful dispersants are also formed by reacting monohydric and polyhydric alcohols with the polyisobutenyl succinic anhydride or diacid provided in accordance with this invention and preferred materials are thus derived from polyols having 2 to 6 hydroxyl groups containing up to about 20 carbon atoms such as the alkene polyols and alkylene glycols. Also suitable are the polyoxyalkylene alcohols such as polyoxyethylene alcohols and polyoxypropylene alcohols, monohydric and polyhydric phenols and naphthols, ether alcohols and amino alcohols and the like. Borated derivatives of the foregoing dispersants are also useful, especially borated nitrogen containing dispersants resulting from boration with boron oxide, boron halide, boron acids and esters to provide 0.2 to 2.0 weight percent boron in the dispersant. Metals and metal-containing compounds can also form useful dispersants and these are compounds capable of forming salts with the polybutenyl succinic anhydride or acid. These include metals such as the alkali metals, alkaline-earth metals, zinc, cadmium, lead, cobalt, nickel, copper, molybdenum, in the form of oxides, carboxylates, halides, phosphates, sulfates, carbonates, hydroxides and the like.

Lubricating oil compositions usually will contain dispersants in amounts of from about 1 to 15 weight percent based on the overall weight of the composition. Lubricating oil compositions typically will contain other additives in customary amounts to provide their normal attendant functions such as metal detergents or basic metal detergents, anti-wear additives, anti-oxidants, viscosity modifiers and the like. Dispersants are conventionally packaged and dispensed in the form of solution concentrates containing about 20 to 50 wt. % dispersant in a mineral oil.

The following examples are illustrative of the principles and practice of this invention, although not limited thereto. Parts and percentages where used are parts and percentages by weight, unless specifically noted otherwise.

EXAMPLE 1

SYNTHESIS OF HIGH CRYSTALLINITY HYDROXYLATED POLYPROPYLENE (a) Copolymerization of Propylene and B-5-Hexenyl-9-BBN (Batch Reaction)

In a typical copolymerization, 15.5 ml (0.2401 mol, 10.09 g) of dried propylene liquid at a temperature of $-78°$ C. was added to a 500 ml evacuated flask containing 200 ml of toluene. The flask was sealed and gradually warmed to room temperature. In a dry box, 49.03 g (0.2401 mol) of B-5-hexenyl-9BBN was added followed by a suspension of 0.901 g ($5.97 \times 10^{-3}$ mol) $TiCl_3AA$ and 4.093 g ($5.585 \times 10^{-3}$ mol) $Al(Et)_3$ aged for ½ hour in 30 ml of toluene. Almost immediately, a precipitate could be seen in the deep purple suspension. The reaction was terminated after 1 hour by addition of 20 ml of cold isopropanol and the reactor contents were poured into a bottle containing 300 ml of isopropanol. The bottle was sealed and placed in a dry-box freezer overnight to facilitate polymer precipitation (or coagulation depending on the borane content). A white, rubbery polymer was isolated by filtration, repeatedly washed with more isopropanol and squeeze dried all in the dry box. A small amount of the white rubbery polymer was vacuum dried, dissolved in $d_8$-toluene, and analyzed by $^{11}$B-NMR at 80° C. using triethylborate as a standard. The procedure outlined above was repeated several times except that the mole % of boron in the feed was varied. A summary of the results is shown in Table I.

TABLE I

COPOLYMERIZATION OF BORANE MONOMER AND α-OLEFINS IN ONE HOUR BATCH REACTIONS

| Copolymers Yield | Mole % B* in Feed | Mole % B* in Copolymer | % |
|---|---|---|---|
| PP-B 66 | 10 | 0.3 | |
| PP-B 38 | 50 | 3.5 | |
| PB-B 64 | 25 | 15 | |
| PB-B 58 | 50 | 37 | |

*B = B-5-hexenyl-9-BBN (b) Copolymerization of Propylene and B-5-Hexenyl-9-BBN (Continuous Reactions)

In an argon filled dry box, 15.477 g of B-5-hexenyl-9-BBN and 200 ml of hexane were placed in a 450 ml stirred pressure reactor and sealed. Outside the box, 12 g of propylene was added under $N_2$ pressure. A slurry of 1.027 g of $TiCl_3AA$ and 4.705 g of $AlEt_2Cl$ in 80 ml of toluene was then added under $N_2$ pressure to catalyze the copolymerization. Additional propylene was added at 30 minute intervals with 10, 8, 6 and 5 g of propylene added respectively. The more reactive propylene was added gradually in order to keep its concentration lower than that of the borane monomer, thereby better incorporating the B-5-hexenyl-9-BBN into the resulting copolymer. After the last monomer charge, the reaction ran an additional 1 hour before being terminating by injection of 100 ml of isopropanol. The reactor was stirred for additional ½ hour and then vented of excess pressure. The reactor contents were then poured into a bottle containing 300 ml of isopropanol. The bottle was sealed and placed in the dry box freezer overnight to facilitate the polymer precipitation or coagulation (depending on the borane content). The polymer was isolated by filtration, washed with more isopropanol, and squeeze dried all in the dry-box.

The procedure outlined above was repeated several times, except that the mole % of boron in the feed or the reaction time was varied. The results of the continuous copolymerization reactions are summarized in Table II.

TABLE II

COPOLYMERIZATION OF POLYPROPYLENE AND BORANE MONOMER IN CONTINUOUS REACTIONS

| Copolymer Yield % | Mole % B* in Feed | Mole % B* in Copolymer |
|---|---|---|
| PP-B 62 | 10 | 3.5 |
| PP-B 75 | 10 | 4.2 |
| PP-B 65 | 13 | 5.0 |
| PP-B 72 | 13 | 7.8 |

*B = B-5-hexenyl-9-BBN (c) Copolymerization of 1-Butene and B-5-Hexenyl-9-BBN in Continuous Reaction Following the procedures of Example 1(b), the continuous copolymerization of 1-butene and B-5-hexenyl-9-BBN was accomplished in a stirred pressure reactor. In an argon filled dry box, 20 g of B-5-hexenyl-9-BBN and 300 ml of hexane were placed in a 450 ml stirred pressure reactor and sealed. Outside the box, 20 g of 1-butene was added under $N_2$ pressure. A slurry of 1.5 g of $TiCl_3AA$ and 6 g of $AlEt_2Cl$ in 80 ml of toluene was then added under $N_2$ pressure to catalyze the copolymerization. Additional propylene was added at 30 minute intervals with 15, 10, 7 and 3 g of 1-butene added respectively. After the last monomer charge, the reaction ran for additional 1 hour before being terminated by injection of 50 ml of isopropanol. The reaction was stirred for additional ½ hour before venting the excess pressure. The reaction contents were then poured into a bottle containing 300 ml of isopropanol. The bottle was sealed and placed in the dry box freezer overnight to facilitate the polymer precipitation or coagulation (depending on the borane content). The polymer was isolated by filtration, washed with more isopropanol, and squeeze dried all in the dry-box.

(d) Synthesis of Hydroxylated Copolymer

In a series of runs, the copolyborane product recovered from the continuous reaction as set forth in (b) and (c) above was added together with 700 ml of tetrahydrofuran to a 2000 ml round bottom flask equipped with an airtight septum and stirrer to form a cloudy white suspension. A solution of 19 g of NaOH in 100 ml of water was degassed and added dropwise into the flask. The flask was then cooled to 0° C. and 87.6 g of degassed 30% $H_2O_2$ solution via a double tipped needle. The reaction was gradually raised to 55° C. and held at the temperature for 6 hours. The resulting hydroxylated copolymer (PP—OH) was then precipitated in water, squeeze dried, and slurried in 500 ml of methanol. After 3 hours of vigorous stirring, approximately 75 ml of methanol was distilled under $N_2$ to remove boric acid-methanol azeotrope. The hydroxylated copolymer was again precipitated in water, squeeze dried, washed with acetone, and dried under high vacuum at 45° C. A run was also made using polypropylene instead of a copolyborane for purposes of comparison. The results of the hydroxylation runs are set forth in Table III.

TABLE III

SYNTHESIS OF HYDROXYLATED COPOLYMER

| Polymer | Mole % B* in Feed | Mole % OH in Polymer | Reaction Time (hr.) | Yield % | η** | Mole % B in Feed | $\bar{M}_v$ (g/mole) |
|---|---|---|---|---|---|---|---|
| PP | 0 | 0 | 2 | 93 | 2.07 | 0 | 230,000 |
| PP-OH | 10 | 3.5 | 3 | 62 | 1.78 | 10 | 183,000 |
| PP-OH | 13 | 5.0 | 3 | 65 | 1.71 | 13 | 174,000 |
| PB-OH | 5 | 2.5 | 2 | 70 | — | 5 | — |
| PB-OH | 10 | 6.5 | 2 | 66 | — | 10 | — |

*B = B-5-hexenyl-9-BBN
**η = intrinsic viscosity

EXAMPLE 2

PREPARATION OF POROUS PP/PP—OH FILMS BY THERMALLY-INDUCED PHASE SEPARATION (TIPS)

(a) Thermally-Induced Phase Separation (TIPS)

A PP—OH sample (3 mole % of hydroxy group and $M_v$=183,000 g/mole), obtained from Example 1, was mixed with polypropylene (PP)($M_v$=230,000 g/mole) and polyethylene glycol (PEG)($M_w$=18,100 g/mole) in xylene at 170° C. at a weight ratio of 1:2:3. The polymer solid was grounded into a powder, placed between a pair of Teflon coated aluminum plates, and then heated to 355° F. After 25 minutes, the polymer powder had melted and the melt was pressed between the plates at pressures up to 1000 psi for 1 hour with the plate temperature maintained at 355° F. The pressed melt was then cooled to and held at room temperature for 30 minutes to form a self-supporting flat film. The film was immersed into a hot water bath at 80° C. for 1 hour to leach out most of the PEG. Any remaining PEG was completely removed by hot water in a soxlet apparatus. The resulting polymer film was placed in a vacuum to remove most of the water contained therein, and was then further dried in a Soxlet apparatus by refluxing THF in a nitrogen atmosphere. The THF solvent was continuously dried by sodium naphathalide reagent in the flask until the sodium naphthalide/THF maintained a green color.

(b) Scanning Electon Microscopy Study

Figure 2:
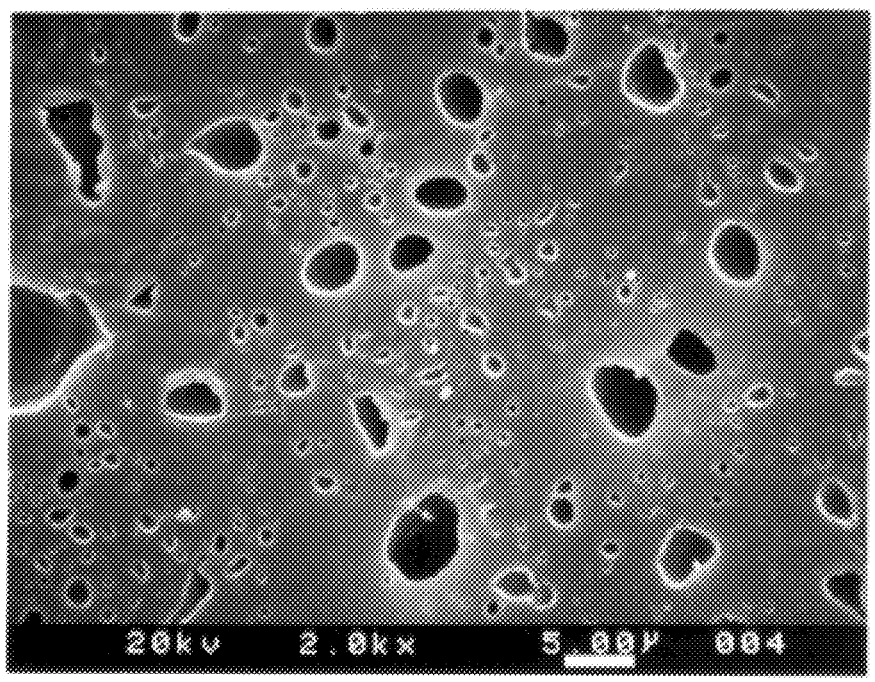
FIG. 2 is a photograph, taken through a scanning electron microscope, of the top surface of the porous film of polypropylene/hydroxylated polypropylene (PP/PP—OH) prepared in Example 2.

The polymer film prepared in Part (a) was examined by scanning electron microscopy (SEM). A cross-sectional view of the polymer film (FIG. 1) showed a very porous structure, whereas a surface view (FIG. 2) shows the combination of a porous structure and the crystalline part of the PP/PP—OH skeleton. The structure consisted of generally spherical pores, with walls formed by the polymer. As shown in FIG. 1, the pore diameter in cross-section ranged from about 1 to about 10 $\mu$m. As shown in FIG. 2, the surface pores had diameters typically ranging from about 0.1 to about 5.0 $\mu$m. Most of the hydroxyl groups were located on the surface of the film including the pore surface because of the chemical affinity between the hydroxyl groups and the PEG.

EXAMPLE 3

PREPARATION OF POROUS PP/PP—OH FILMS BY THERMALLY-INDUCED PHASE SEPARATION (TIPS)

Figure 3:
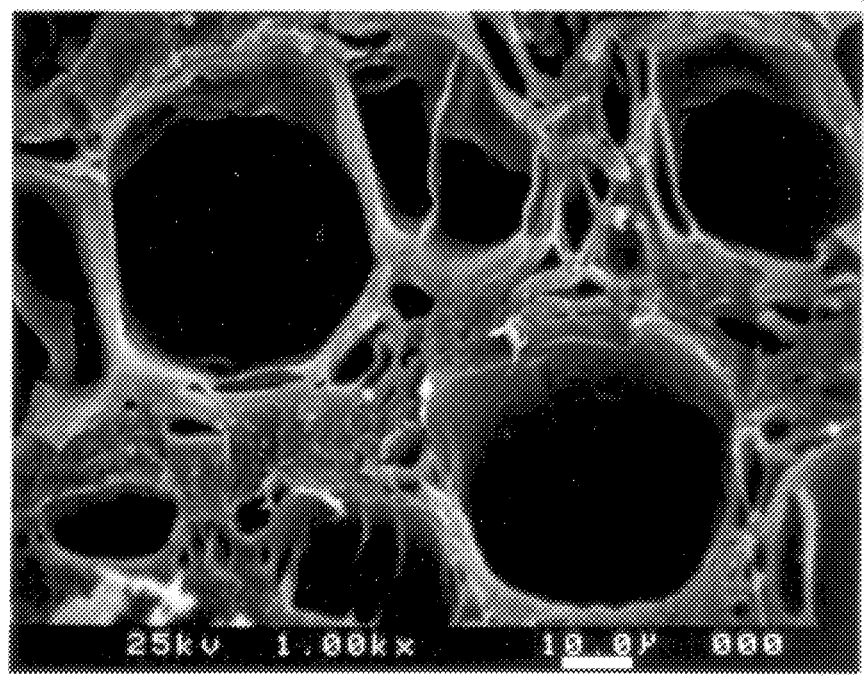
FIG. 3 is a photograph, taken through a scanning electron microscope, of a cross-section of the porous film of polypropylene/hydroxylated polypropylene (PP/PP—OH) prepared in Example 3.
Figure 4:
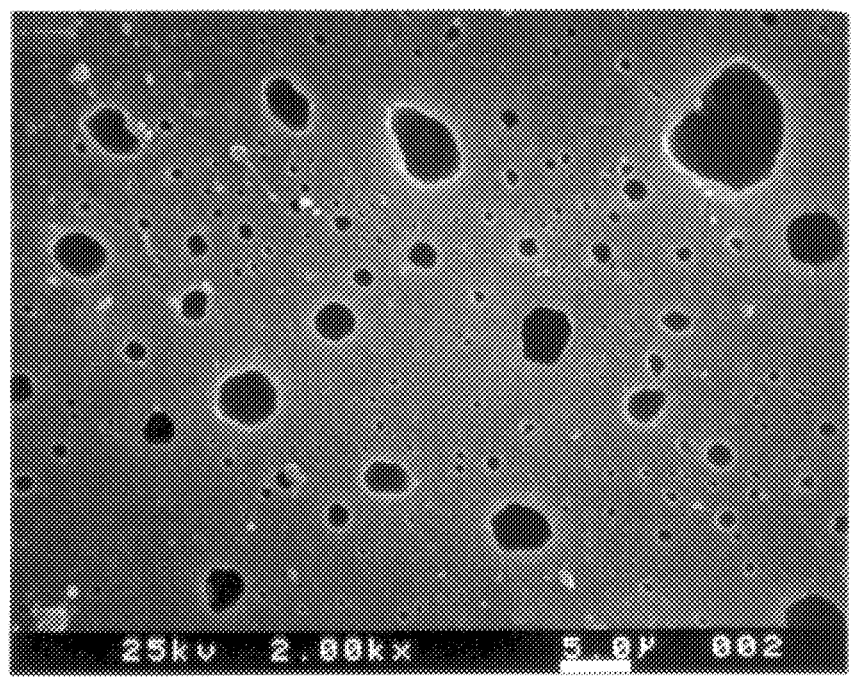
FIG. 4 is a photograph, taken through a scanning electron microscope, of the top surface of the porous film of polypropylene/hydroxylated polypropylene (PP/PP—OH) prepared in Example 3.

Following the procedure described in Example 2, a 1:10:10 (weight ratio) blend of PP—OH: PP: PEG were mixed in xylene. After heating to 170° C., the resulting polymer solution was homogeneous. The solution was then cooled to room temperature and the solvent was removed by evaporation. After solvent removal, the polymer solid was ground into particles which were then molded into a film under 1000 psi pressure and at 355° F. Following Soxlet extraction by hot water and the drying process described Example 2, the resulting porous film was examined by SEM. As shown in FIGS. 3 (cross-section) and 4 (surface view), the basic structure of the porous film was the same as that of the film prepared in Example 2. The pore sizes on the surface are very similar. However, some pores of the cross-section were quite large, i.e. more than 30 $\mu$m in diameter.

EXAMPLE 4

PREPARATION OF POROUS PP/PP—OH FILMS BY THERMALLY-INDUCED PHASE SEPARATION (TIPS)

Figure 5:
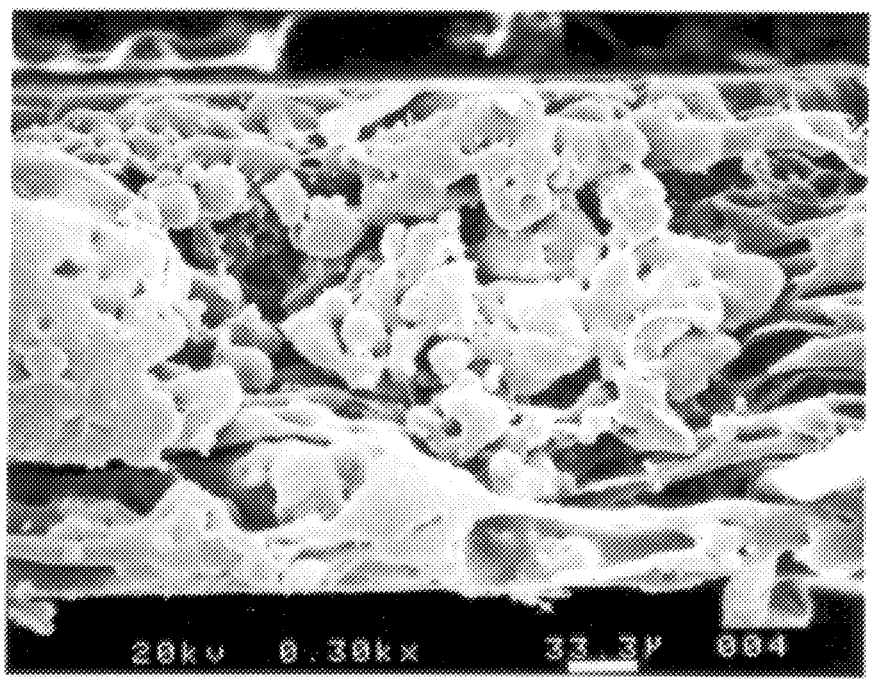
FIG. 5 is a photograph, taken through a scanning electron microscope, of a cross-section of the porous film of polypropylene/hydroxylated polypropylene (PP/PP—OH) prepared in Example 4.
Figure 6:
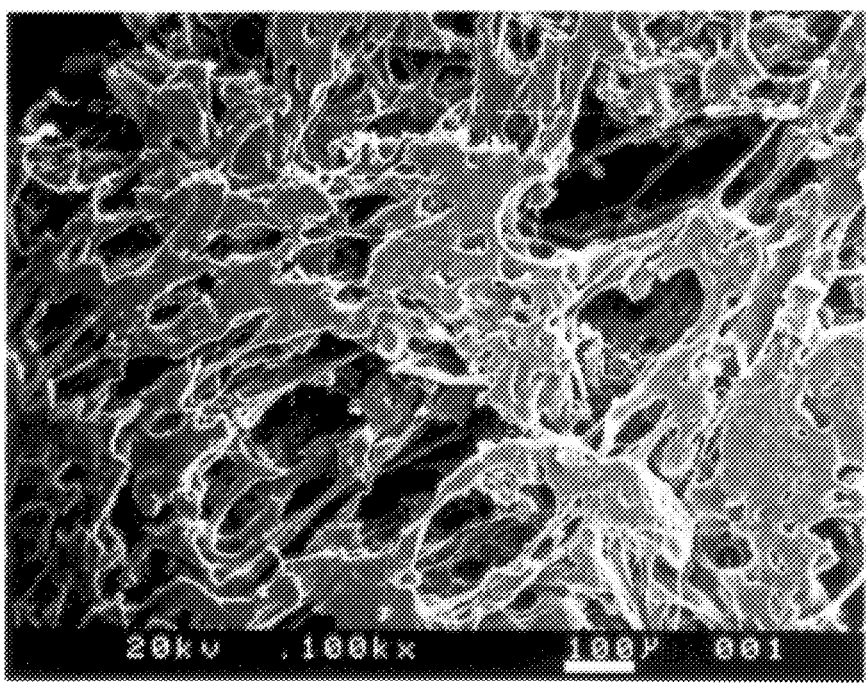
FIG. 6 is a photograph, taken through a scanning electron microscope, of the top surface of the porous film of polypropylene/hydroxylated polypropylene (PP/PP—OH) prepared in Example 4.

The procedure of Example 2 was repeated, except that the cooling and solidification steps were modified. More specifically, the polymer melt was pressed between the Teflon coated aluminum plates for 1 hour at approximately 355° F. and then directly immersed into a hot water bath at 80° C. where the Teflon coated aluminum plates were removed from the gel film. A major portion of PEG was allowed to extract during the solidification process. The SEM results of the full cross-section view (FIG. 5) showed that the film had a fibrils and multi-form spherulites. The surface of this film (FIG. 6) exhibited a very coarse and branched lamellae structure.

EXAMPLE 5

PREPARATION OF POROUS PP/PP—OH FILMS BY PHASE-INVERSION SOLUTION CASTING (PISC)

(a) Porous PP/PP—OH Film by Phase-Inversion Solution Casting

A PP—OH sample (3 mole % of hydroxy group and $M_v$=183,000 g/mole), obtained from Example 1, was mixed with PP ($M_v$=230,000 g/mole) and PEG ($M_w$=18,100 g/mole) in xylene at 170° C. in a weight ratio of 1:10:10:120. The mixture was stirred for 1 hour at 170° C. to form a homogeneous solution, whereafter the solution was poured onto a glass plate. The solution was spread in a thin film using a spacer and the solvent as allowed to preevaporate under room temperature and humidity for 30 minutes. The glass plate containing the film was then immersed into a basin of water to remove the PEG. To ensure the complete removal of the PEG, the polymer film was subjected to hot water extraction using a Soxlet apparatus. The polymer film was then dried following the same procedure shown in Example 2.

(b) Scanning Electon Microscopy Study

Figure 7:
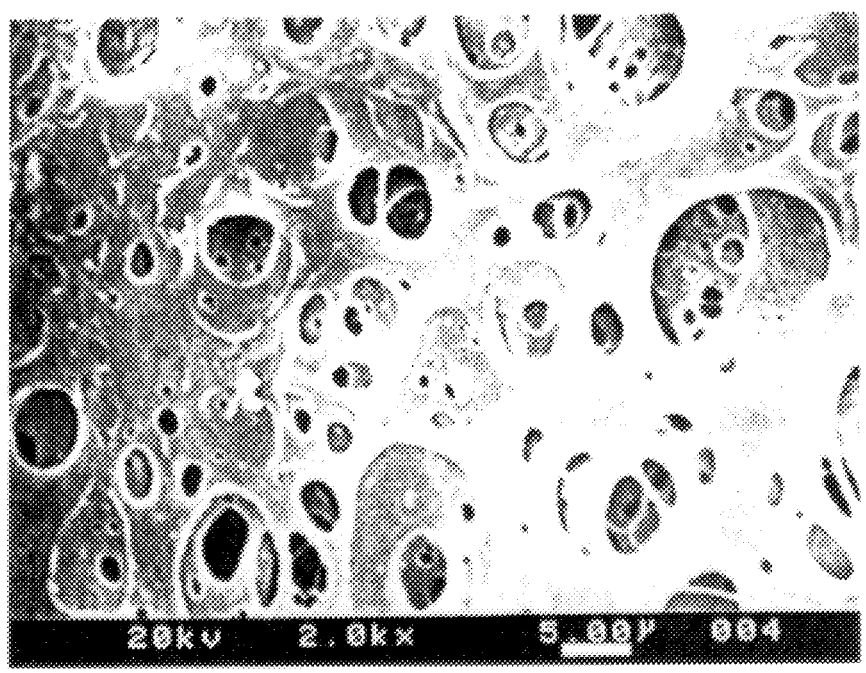
FIG. 7 is a photograph, taken through a scanning electron microscope, showing the highly porous structure on the air-exposed surface of the asymmetrical porous film prepared in accordance with Example 5.
Figure 8:
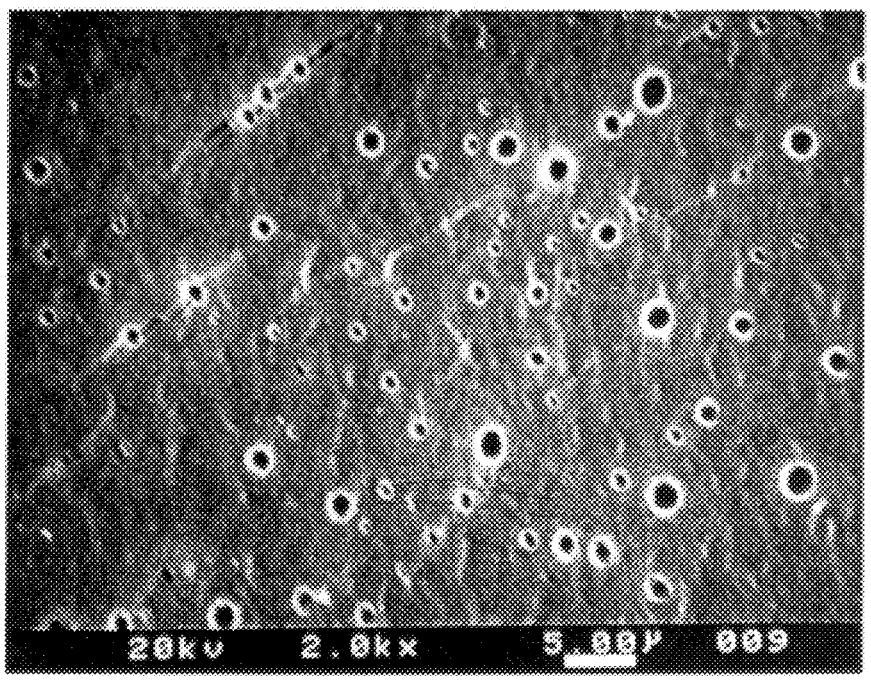
FIG. 8 is a photograph, taken through a scanning electron microscope, showing the relatively dense structure on the surface of the asymmetrical porous film of Example 5 which contacted the glass plate during the preparation of the porous film.

The resulting PP/PP—OH porous film was examined by scanning electron microscopy (SEM). As shown in FIGS. 7 and 8 an asymmetrical porous film was obtained with a highly porous structure on the surface exposed to air (FIG. 7) and a relatively dense structure on the surface contacting the glass (FIG. 8). The pores on the surface exposed to air were also larger than the pores on the surface in contact with the glass, i.e., the pores on the surface exposed to the air had a pore diameter between about 2 $\mu$m and about 20 $\mu$m, whereas the pores in the other surface generally were below about 2 $\mu$m. Overall, the structure of the film consisted of spherical large pores and most of the hydroxy groups were located on the surface of film including the pore surface because of the chemical affinity between the hydroxy groups and the PEG.

EXAMPLE 6

PREPARATION OF POROUS PP—OH FILMS BY PHASE-INVERSION SOLUTION CASTING (PISC)

Figure 9:
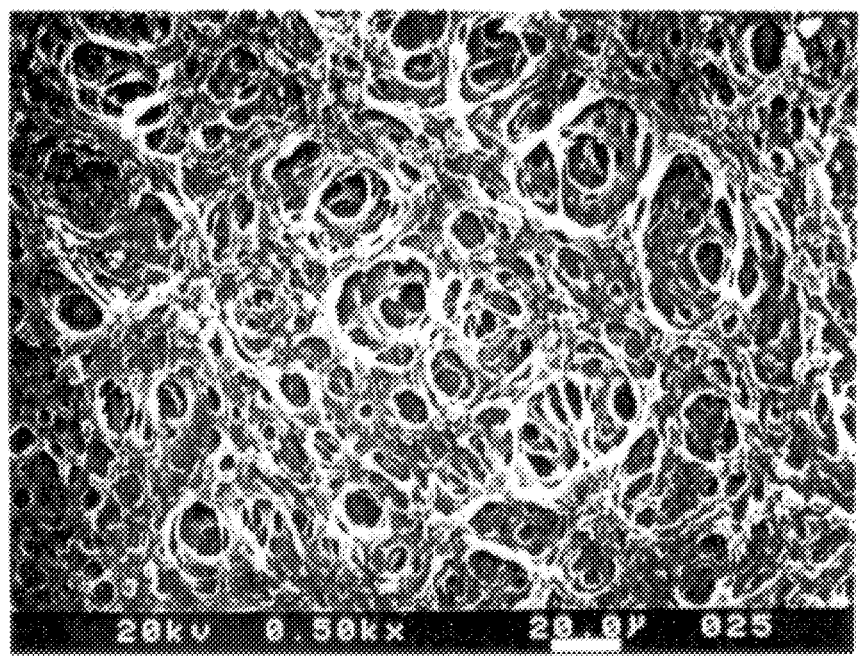
FIG. 9 is a photograph, taken through a scanning electron microscope, showing the highly porous structure on the air-exposed surface of the asymmetrical porous film prepared in accordance with Example 6.
Figure 10:
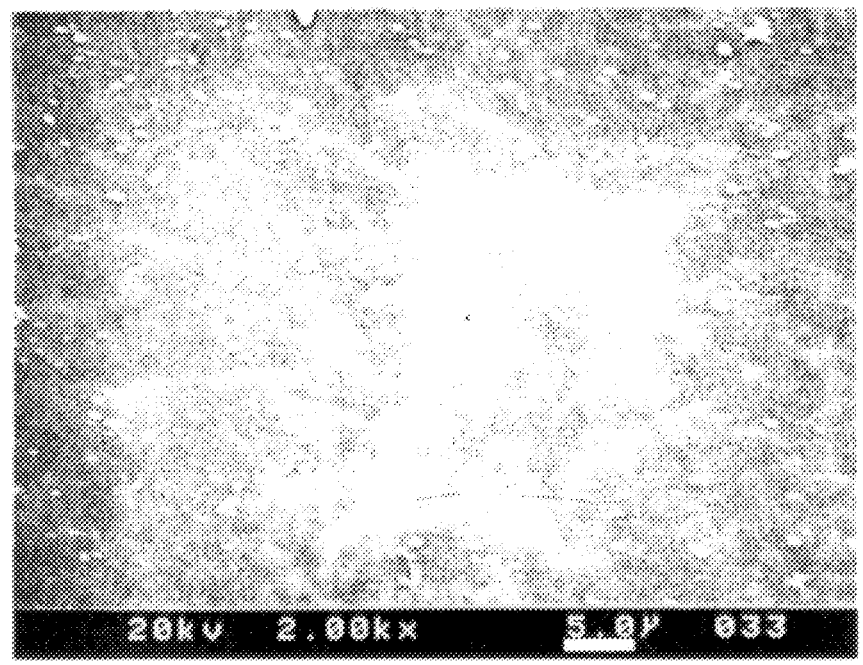
FIG. 10 is a photograph, taken through a scanning electron microscope, showing the dense structure on the surface of the asymmetrical porous film of Example 6 which contacted the glass plate during the preparation of the porous film.

A 1:1:15 (weight ratio) blend of PP—OH: phenol: xylene were mixed and spread in a thin film as described in Example 5. After the solvent was allowed the preevaporate under room temperature and humidity for 30 minutes, the glass plate containing the film was immersed in a bath of methanol to extract any remaining phenol. Examined by SEM, the film had a porous structure in air-facing surface with the average pore diameter between about 10 and about 30 $\mu$m (FIG. 9), and a completely dense structure facing the glass surface (FIG. 10).

EXAMPLE 7

IMMOBILIZATION OF LEWIS ACIDS ON THE POROUS FILMS

In a dry box, a dried porous film of PP/PP—OH (1 g and weight ratio of PP/PP—OH=3/1) obtained from Example 2 was suspended in 60 ml of toluene solution with 30 mmole of $EtAlCl_2$. A reaction between the film and $EtAlCl_2$ was carried out at room temperature for 3 hours. The film was separated from the reaction by decanting the solution. The film was then washed with dry hexane several times to remove any remaining toluene and $EtAlCl_2$. After hexane removal by vacuum evaporation, the resulting immobilized catalyst (PP/PP—$OAlCl_2$) weighed about 1.025 g indicating that most of the —OH groups were converted to —$OAlCl_2$ groups. Solid state $^{27}Al$ NMR measurement was also used to analyze the catalytic species. Only a single peak at 89 ppm, corresponding to —$OAlCl_2$ was observed. There was no peak at 170 ppm, corresponding to $EtAlCl_2$. The same chemical shift was also observed with a reference sample, using 1-pentanol instead of the hydroxylated polypropylene in a reaction with a stoichiometric amount of $EtAlCl_2$.

EXAMPLE 8

IMMOBILIZATION OF LEWIS ACIDS ON THE POROUS FILMS

Following a procedure similar to that described in Example 7, a dried porous film of PP/PP—OH (0.3 g and weight ratio of PP/PP—OH=10/1) obtained from Example 3 was suspended in 30 ml of toluene solution with 10 mmole of $EtAlCl_2$. A reaction between the film and the $EtAlCl_2$ was carried out at room temperature for 1 hour. After decanting the solution, the polymer film was washed with dry hexane several times to remove any remaining toluene and $EtAlCl_2$. After hexane removal by vacuum evaporation, the resulting immobilized catalyst (PP/PP—$OAlCl_2$) was weighed and subjected to $^{27}Al$ NMR analysis. Both the increase in weight of the film and the $^{27}Al$ NMR analysis confirmed that most of the —OH groups were converted to —$OAlCl_2$ groups.

EXAMPLE 9

POLYMERIZATION OF ISOBUTYLENE USING POROUS PP/PP—O—$AlCl_2$ FILM

The porous PP/PP—$OAlCl_2$ film (PP/PP—$OAlCl_2$=3/1 and 5 mole % of $OAlCl_2$ in PP—$OAlCl_2$) from Example 7 was used as Lewis Acid catalyst for the cationic polymerization of isobutylene. The polymerization was carried out in a high vacuum apparatus consisting of two 200 ml flasks equipped with magnetic stirrers. One stopcock was used to separate two flasks (A and B), the other stopcock located on the top of flask A was used to control the vacuum condition and inert gas flow. After the apparatus was dried for over 12 hours, a portion of the immobilized catalyst PP/PP—$OAlCl_2$ (0.3 g) obtained from Example 7 was charged to flask B in a dry box condition. The system was connected to a vacuum line and pumped to high vacuum, and then 30 ml of dry hexane and 5 ml of dry isobutylene were vacuum-distilled into flask A by immersing the flask in a dry ice/acetone bath. The monomer solution in flask A was warmed up to room temperature before pouring its contents into flask B. The polymerization was carried out at ambient temperature with stirring. After 15 minutes reaction time, the catalyst was allowed to settle and the solution portion, which contained polyisobutylene/hexane, was then pipetted from flask B. After solvent-evaporation under vacuum, a viscous polyisobutylene polymer was obtained. This procedure was repeated for several runs to evaluate the polymerization reactivity in the subsequent cycles. lThe results are summarized in Table IV.

TABLE IV

POLYISOBUTYLENE PREPARED BY USING POROUS PP/PP-$OAlCl_2$ FILM

| Run # | Reaction Time (Min) | Yield (%) | Temp. (°C.) | $\bar{M}_w$*, (g/mole) | PDI** |
|---|---|---|---|---|---|
| 1 | 15 | 90% | 25 | 1716 | 1.9 |
| 2 | 15 | 85% | 25 | 1804 | 1.5 |
| 3 | 30 | 97% | 25 | 1630 | 1.7 |
| 4 | 15 | 80% | 0 | 4520 | 2.5 |
| 5 | 30 | 95% | 0 | 4228 | 3.5 |
| 6 | 30 | 92% | 0 | 4526 | 3.2 |

\* = weight average molecular weight determined by GPC using a polystyrene calibration standard.
\*\* = polydispersity.

EXAMPLE 10

POLYMERIZATION OF ISOBUTYLENE USING POROUS PP/PP—O—$AlCl_2$ FILM

Following the procedure described in Example 9, a porous PP/PP—$OAlCl_2$ film (0.3 mg with the composition of PP/PP—$OAlCl_2$=3/1, 3.5 mole % of O—$AlCl_2$ in PP—$OAlCl_2$ and film thickness of 2 mm) was used in several runs as Lewis Acid catalyst for the cationic polymerization of isbutylene. In each run, the immobilized catalyst was immersed in 30 ml of hexane, and 5 ml of isobutylene was then added to the reaction mixture. After polymerization at the temperature and reaction time specified in Table V, the product polyisobutylene (PIB) solution was easily separated from the immobilized catalyst by decantation in a dry box. Polyisobutylene was obtained by evaporating the solvent and the recovered polymer catalyst was recycled. The results are summarized in the Table V.

TABLE V

POLYISOBUTYLENE PREPARED USING POROUS 2 mm THICK PP/PP-$OAlCl_2$ FILM

| Run # | Reaction Time (Min) | Yield (%) | Temp. (°C.) | $\bar{M}_w$, (g/mole) | PDI |
|---|---|---|---|---|---|
| 1 | 120 | 95% | 25 | 4442 | 2.9 |
| 2 | 60 | 97% | 25 | 5305 | 3.8 |
| 3 | 30 | 97% | 0 | 6700 | 3.1 |
| 4 | 30 | 96% | 0 | 14262 | 3.9 |
| 5 | 30 | 96% | 0 | 11130 | 3.3 |
| 6 | 3O | 97% | 0 | 11613 | 2.7 |
| 7 | 30 | 95% | 25 | 6219 | 3.5 |
| 8 | 30 | 97% | 0 | 6611 | 3.1 |
| 9 | 30 | 96% | 25 | 4637 | 3.6 |
| 10 | 30 | 97% | 0 | 10748 | 2.5 |
| 11 | 30 | 96% | 25 | 3461 | 2.1 |
| 12 | 30 | 95% | 25 | 2885 | 2.7 |
| 13 | 30 | 98% | 0 | 6391 | 2.9 |
| 14 | 30 | 95% | 25 | 2879 | 2.5 |
| 15 | 15 | 94% | 25 | 2800 | 2.6 |
| 16 | 30 | 96% | 25 | 3768 | 3.1 |

EXAMPLE 11

POLYMERIZATION OF ISOBUTYLENE USING POROUS PP/PP—O—$AlCl_2$ FILM

Following the procedure described in Example 9, the immobilized catalyst PP/PP—$OAlCl_2$ (0.3 mg, 3.5 mole % of $OAlCl_2$, the weight ratio of PP/PP—OH=10/1 and thickness =0.2 mm) was immersed in 30 ml of hexane, and 5 ml of isobutylene was then added to this mixture. After polymerization at the designated temperature and reaction time specified in Table VI the product polyisobutylene (PIB) solution was easily separated from the immobilized catalyst by decantation in the dry box. Polyisobutylene was obtained by evaporating the solvent and the recovered polymer catalyst was recycled. The results are summarized in the Table VI.

TABLE VI

POLYISOBUTYLENE PREPARED USING 0.2 MM THICK POROUS PP/PP-OAlCl, FILM

| Run # | Reaction Time (Min) | Yield (%) | Temp. (°C.) | $\bar{M}_w$, (g/mole) | PDI |
|---|---|---|---|---|---|
| 1 | 20 | 90% | 25 | 2545 | 2.02 |
| 2 | 20 | 85% | 25 | 2830 | 2.85 |
| 3 | 20 | 95% | 25 | 3255 | 2.65 |
| 4 | 30 | 98% | 25 | 3285 | 2.32 |

EXAMPLE 12

POLYMERIZATION OF ISOBUTYLENE USING REGENERATED POROUS PP/PP—OAlCl$_2$ FILM

Following the procedure described in Example 11, the polymerization reaction was taken place by mixing the immobilized catalyst PP/PP—OAlCl$_2$ (PP/PP—OH=10/1, 5 mole % of OAlCl$_2$ in PP—OAlCl$_2$ and thickness=2 mm) with 5 ml of isobutylene in 30 ml of hexane. After three polymerization cycles at the designated temperature and reaction time, the recovered polymer catalyst was deactivated by slowly exposing it to air. The removal of Al adducts and regeneration of —OH groups were done by immersing the deactivated catalyst in 100 ml of NaOH (5M) aqueous solution. After stirring at room temperature for 24 hours, the recovered PP/PP—OH was placed in a vacuum to remove most of the water present, and then was further dried in a Soxlet apparatus by refluxing THF in nitrogen atomosphere. The THF solvent was constantly dreid by sodium naphthalide reagent in the flask. This process was continued until the sodium naphthalide/THF solution remained green.

In a dry box, the recovered porous films of PP/PP—OH was then suspended in 60 ml of toluene solution with 30 mmole of EtAlCl$_2$. The reaction was carried out at room temperature for 3 hours. The catalyst films were separated from the solution by decanting the solution, and were washed with dry hexane several times to remove any remaining toluene and EtAlCl$_2$. After hexane removal by vacuum, the regenerated catalyst (PP/PP—OAlCl$_2$) was used in several runs to polymerize isobutylene. The polymerization were performed in accordance with the procedures described in Example 11. The results of the polymerization runs are summerized in Table VII, wherein Runs 1–3 used the original catalyst and Runs 4–12 used the regenerated catalyst.

TABLE VII

POLYISOBUTYLENE PREPARED USING POROUS PP/PP-O-AlCl$_2$
(BOTH ORIGINAL AND REGENERATED CATALYSTS)

| Run # | Reaction Time (Min) | Yield (%) | Temp. (°C.) | $\bar{M}_w$, (g/mole) | PDI |
|---|---|---|---|---|---|
| | | uz,12/21 (original catalyst) | | | |
| 1 | 30 | 91% | 25 | 1881 | 2.1 |
| 2 | 30 | 87% | 25 | 1430 | 1.8 |
| 3 | 30 | 94% | 25 | 1522 | 1.9 |
| | | (regenerated catalyst) | | | |
| 4 | 30 | 94% | 0 | 28400 | 5.0 |
| 5 | 30 | 94% | 0 | 22660 | 4.8 |
| 6 | 30 | 97% | 0 | 9615 | 2.6 |
| 7 | 15 | 96% | 25 | 623 | 1.2 |
| 8 | 30 | 99% | 25 | 1116 | 1.4 |
| 19 | 30 | 98% | 0 | 5548 | 1.9 |
| 10 | 30 | 99% | 0 | 3073 | 2.8 |
| 11 | 30 | 99% | 0 | 2908 | 2.3 |
| 12 | 30 | 97% | 0 | 3623 | 2.3 | what is claimed is:

1. Immobilized Lewis Acid catalyst comprising porous polymer film substrate having at least one Lewis Acid immobilized on pore surfaces thereof, said polymer film substrate, prior to having said Lewis Acid immobilized thereon, comprising a porous film of functionalized polymer and, optionally, unfunctionalized polymer, said functionalized polymer having within its structure units represented by the formula

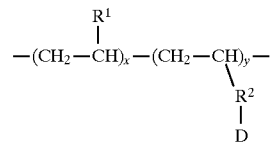

and said unfunctionalized polymer having within its structure repeating monomer units represented by the formula

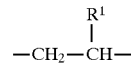

wherein
  D represents OH, halide, NH$_2$, NHR$^3$, OM', or OM";
  R$^1$ represents hydrogen, C$_1$–C$_{24}$ alkyl, C$_3$–C$_{24}$ cycloalkyl, C$_6$–C$_{18}$ aryl or C$_7$–C$_{30}$ alkylaryl;
  R$^2$ represents C$_3$–C$_{24}$ alkyl, C$_3$–C$_{24}$ cycloalkyl, C$_6$–C$_{18}$ aryl or C$_7$–C$_{30}$ alkaryl;
  R$^3$ represents C$_1$–C$_{24}$ alkyl, C$_3$–C$_{24}$ cycloalkyl, C$_6$–C$_{18}$ aryl or C$_7$–C$_{30}$ alkaryl;
  M' represents alkali metal;
  M" represents alkaline-earth metal; and
  x and y represent the mole % of each respective subunit, the sum of x+y being 100%.

2. The immobilized catalyst according to claim 1 wherein said porous polymer substrate, prior to immobilization of said Lewis Acid, comprises a blend of functionalized and unfunctionalized polymer and wherein the weight ratio of unfunctionalized polymer to functionalized polymer is from about 0.1:1 to about 50:1.

3. The immobilized catalyst according to claim 1, wherein at least one of said functionalized polymer and said unfunctionalized polymer has a backbone derived from propylene, 1-butene, ethylene and mixtures thereof.

4. The immobilized catalyst according to claim 2, wherein at least one of said functionalized polymer and said unfunctionalized polymer has a backbone derived from propylene, 1-butene, ethylene and mixtures thereof.

5. The immobilized catalyst according to claim 1, wherein said porous polymer film substrate, after having said Lewis Acid immobilized thereon, comprises within its structure at least one unit represented by the formulas

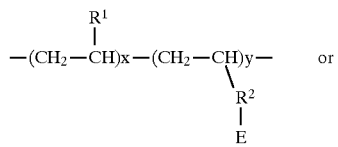 or

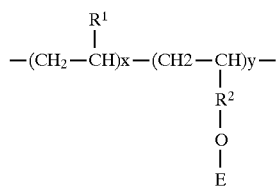

wherein E represents the residue of the reaction of at least one Lewis Acid with the D substituent on said functionalized polymer.

6. The immobilized catalyst according to claim 2, wherein said porous polymer film substrate, after having said Lewis Acid immobilized thereon, comprises within its structure at least one unit represented by the formulas

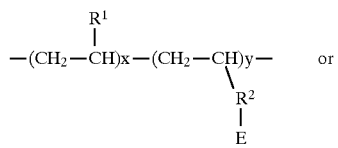 or

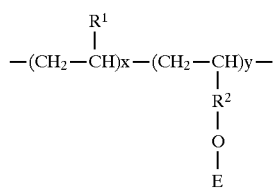

wherein E represents the residue of the reaction of at least one Lewis Acid with the D substituent on said functionalized polymer.

7. The immobilized catalyst according to claim 5, wherein E is derived from Lewis Acid selected from the group consisting of boron halides, aluminum halides, alkyl aluminum halides, titanium halides and combinations thereof.

8. The immobilized catalyst according to claim 6, wherein E is derived from Lewis Acid selected from the group consisting of boron halides, aluminum halides, alkyl aluminum halides, titanium halides and combinations thereof.

9. The immobilized catalyst according to claim 7, wherein the backbone of at least one of said functionalized polymer and said unfunctionalized polymer is derived from propylene.

10. The immobilized catalyst according to claim 8, wherein the backbone of at least one of said functionalized polymer and said unfunctionalized polymer is derived from propylene.

11. The immobilized catalyst according to claim 7, wherein the backbone of at least one of said functionalized polymer and said unfunctionalized polymer is derived from 1-butene.

12. The immobilized catalyst according to claim 8, wherein the backbone of at least one of said functionalized polymer and said unfunctionalized polymer is derived from 1-butene.

13. The immobilized catalyst according to claim 5, which comprises at least one unit represented by the formula

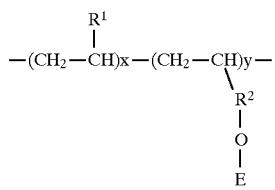

14. The immobilized catalyst according to claim 6, which comprises at least one unit represented by the formula

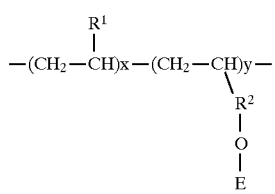

15. The immobilized catalyst according to claim 13, where $R^2$ is $C_3$–$C_5$ alkyl.

16. The immobilized catalyst according to claim 14, where $R^2$ is $C_3$–$C_5$ alkyl.

17. A process for preparing an immobilized Lewis Acid catalyst which comprises:
(a) forming a porous polymer film substrate comprising functionalized polymer and, optionally, unfunctionalized polymer, said functionalized polymer having within its structure units represented by the formula

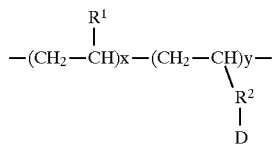

and said unfunctionalized polymer having within its structure repeating monomer units represented by the formula

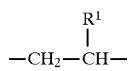

wherein
D represents OH, halide, $NH_2$, $NHR^3$, OM', or OM";
$R^1$ represents hydrogen, $C_1$–$C_{24}$ alkyl, $C_3$–$C_{24}$ cycloalkyl, $C_6$–$C_{18}$ aryl or $C_7$–$C_{30}$ alkylaryl;
$R^2$ represents $C_3$–$C_{24}$ alkyl, $C_3$–$C_{24}$ cycloalkyl, $C_6$–$C_{18}$ aryl or $C_7$–$C_{30}$ alkaryl;
$R^3$ represents $C_1$–$C_{24}$ alkyl, $C_3$–$C_{24}$ cycloalkyl, $C_6$–$C_{18}$ aryl or $C_7$–$C_{30}$ alkaryl;
M' represents alkali metal;
M" represents alkaline-earth metal; and
x and y represent the mole % of each respective subunit, the sum of x×y being 100%; and
(b) contacting the porous polymer film with at least one Lewis Acid to effect an immobilization reaction between said Lewis Acid and the D substituted on said functionalized polymer.

18. The process according to claim 17, wherein said porous polymer film substrate is prepared by forming a blend of functionalized polymer, unfunctionalized polymer and pore forming agent capable of being removed from said blend, shaping said blend into a non-porous film, and thereafter removing said pore forming agent from said non-porous film to thereby form said porous polymer film.

19. The process according to claim 18, wherein said pore forming agent is removed from said non-porous film by solvent extraction.

20. The process according to claim 19, wherein said solvent comprises hot water.

21. The process according to claim 18, wherein said pore forming agent is selected from the group consisting of polyethylene glycol, polyvinylpyrrolidone, phenol and mixture thereof.

22. The process according to claim 18, wherein at least one of said functionalized polymer and said unfunctionalized polymer has a backbone derived from propylene, 1-butene, ethylene and mixtures thereof.

23. The process according to claim 18, wherein said porous polymer film substrate, after having said Lewis Acid immobilized thereon, comprises within its structure at least one unit represented by the formulas

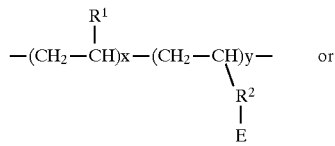

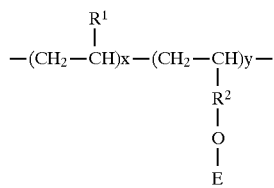

wherein E represents the residue of the reaction of at least one Lewis Acid with the D substituent on said functionalized polymer.

24. The process according to claim 22, wherein said porous polymer film substrate, after having said Lewis Acid immobilized thereon, comprises within its structure at least one unit represented by the formulas

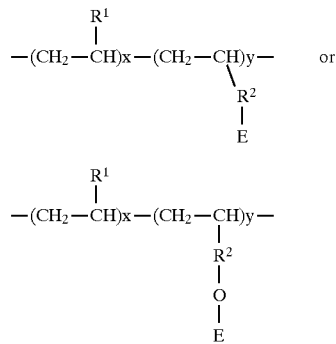

wherein E represents the residue of the reaction of at least one Lewis Acid with the D substituent on said functionalized polymer.

25. The process according to claim 18, wherein said porous polymer film substrate is formed by phase-inversion solution casting.

26. The process according to claim 18, wherein said porous polymer film substrate is formed by thermally-induced phase separation.

* * * * *